US006990466B1

(12) United States Patent
Hu

(10) Patent No.: US 6,990,466 B1
(45) Date of Patent: Jan. 24, 2006

(54) METHOD AND SYSTEM FOR INTEGRATING CORE BANKING BUSINESS PROCESSES

(75) Inventor: Shiann-Jong Hu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/634,435

(22) Filed: Aug. 8, 2000

(30) Foreign Application Priority Data

Aug. 11, 1999 (JP) ................................ 11-111784

(51) Int. Cl.
G06F 17/60 (2006.01)
(52) U.S. Cl. ........................... 705/35; 705/40; 705/42; 707/10; 709/201; 719/313
(58) Field of Classification Search .................. 705/35, 705/30, 42, 40, 65, 17; 707/202, 103 R, 707/102; 709/217, 101, 201, 203; 717/103, 717/130, 102; 379/93.17; 235/379; 345/789; 714/6, 37, 20; 711/173; 719/313
See application file for complete search history.

(56) References Cited

U.S. PATENT DOCUMENTS

| 4,727,243 | A | * | 2/1988 | Savar ........................... 705/17 |
| 5,095,421 | A | * | 3/1992 | Freund ........................ 709/101 |
| 5,287,501 | A | * | 2/1994 | Lomet ......................... 707/202 |
| 5,412,801 | A | * | 5/1995 | de Remer et al. ............ 714/20 |
| 5,437,026 | A | * | 7/1995 | Borman et al. .............. 707/202 |
| 5,452,430 | A | * | 9/1995 | Dievendorff et al. ......... 714/37 |
| 5,485,370 | A | * | 1/1996 | Moss et al. ............... 379/93.17 |
| 5,684,988 | A | | 11/1997 | Pitchaikani et al. |
| 5,734,823 | A | * | 3/1998 | Saigh et al. ................. 709/217 |
| 5,890,140 | A | * | 3/1999 | Clark et al. ................... 705/35 |
| 5,920,848 | A | * | 7/1999 | Schutzer et al. .............. 705/42 |
| 5,930,512 | A | * | 7/1999 | Boden et al. ................ 717/102 |
| 5,930,831 | A | * | 7/1999 | Marsh et al. ................ 711/173 |
| 5,933,593 | A | * | 8/1999 | Arun et al. ...................... 714/6 |
| 5,933,816 | A | * | 8/1999 | Zeanah et al. ................ 705/35 |
| 6,006,229 | A | * | 12/1999 | Schmidt et al. ............... 707/10 |
| 6,006,277 | A | * | 12/1999 | Talati et al. ................. 719/313 |
| 6,018,627 | A | * | 1/2000 | Iyengar et al. .............. 717/103 |
| 6,041,312 | A | * | 3/2000 | Bickerton et al. ............. 705/30 |

(Continued)

FOREIGN PATENT DOCUMENTS

JP 06-225111 8/1994

(Continued)

OTHER PUBLICATIONS

Kistner, Toni, "Will Banks embrace Microsoft's Integration Tool?", Bank Technology News, pNA, Feb. 1999.*

(Continued)

Primary Examiner—Yogesh C. Garg
(74) Attorney, Agent, or Firm—Douglas A. Lashmit; Hoffman, Warnick & D'Alessandro LLC

(57) ABSTRACT

A system and method are provided for integrating core banking business processes which includes a business platform in which two or more selected banking processes common to the core banking business are integrated. The business platform includes at least one database for sharing data between the core banking business processes and to provide the system with customer and business information. The business platform invokes a basic business rule library formed of two or more basic business operations to be implemented and a common function library which includes at least one common function program which is called by the basic business operations. One or more application business subsystems each formed of a combination of the basic business operations are called by the business platform to perform selected operations as required by a particular banking transaction.

20 Claims, 21 Drawing Sheets

U.S. PATENT DOCUMENTS

| | | | | |
|---|---|---|---|---|
| 6,070,152 | A | * | 5/2000 | Carey et al. .................. 705/35 |
| 6,076,092 | A | * | 6/2000 | Goldberg et al. ....... 707/103 R |
| 6,119,104 | A | * | 9/2000 | Brumbelow et al. .......... 186/37 |
| 6,122,625 | A | * | 9/2000 | Rosen ........................ 235/379 |
| 6,185,545 | B1 | * | 2/2001 | Resnick et al. ............... 705/40 |
| 6,189,785 | B1 | * | 2/2001 | Lowery ...................... 235/379 |
| 6,289,320 | B1 | * | 9/2001 | Drummond et al. .......... 705/35 |
| 6,360,249 | B1 | * | 3/2002 | Courts et al. ............... 345/789 |
| 6,519,766 | B1 | * | 2/2003 | Barritz et al. ............... 717/130 |
| 6,625,610 | B1 | * | 9/2003 | Siegel et al. ................ 707/102 |
| 2002/0038289 | A1 | * | 3/2002 | Lawlor et al. ................ 705/42 |

FOREIGN PATENT DOCUMENTS

| | | | |
|---|---|---|---|
| JP | 08235239 A | * | 9/1996 |
| WO | WO 94/18620 | * | 8/1994 |
| WO | WO 00/10294 | | 2/2000 |

OTHER PUBLICATIONS

Korth et al. (Text Book, "Database system concepts" McGraw-Hill, Inc., New York, Copyright © 1991, 1986).*

Printed pamphlet for CICS OS/2 Developer kit CD-ROM, 1st Edition (May 1994, a total of 4 pages.*

IBM publication; "Information Warehouse in the Finance Industry"; Document No. GG24-4340-00; Aug. 1994; International Technical Support Organization, San Jose, extracted from Google database on Jun. 20, 2004.*

IBM publication; "Workflow and Image Library: FlowMark and VisualInfo with Windows"; Aug. 1996; IBM International Technical Support Organization Rochester Center, extracted from Google database on Jun. 20, 2004.*

Application Design Guide; IBM Publication No. GC33-0999-00, Mar. 26, 1993, 43 pgs.

CICS Family: API Structure, IBM Publication No. SC33-1007-01, Feb. 2, 1996, 154 pgs.

CICS for OS/2 Version 2.0.1. Application Programming, IBM Publication No. SC33-0883-01, Sep. 4, 1995; 357 pgs.

CICS for OS/2 Version 2.0.1 Customization, IBM Publication No. SC33-0880-01, Jun. 19, 1996, 265 pgs.

CICS for OS/2 Version 2.0.1 Installation, IBM Publication No. GC33-0879-01, Jun. 19, 1996, 78 pgs.

CICS for OS/2 Version 2.0.1 Intercommunication, IBM Publication No. SC33-0826-01, Nov. 28, 1994, 197 pgs.

CICS for OS/2 Version 2.0.1 Operation, IBM Publication No. SC33-0881-01, Jun. 19, 1996, 128 pgs.

CICS for OS/2 Version 2.0.1 Problem Determination, IBM Publication No. SC33-1005-01, Jun. 19, 1996, 212 pgs.

Messages and Codes, IBM Publication No. SC33-1426-00, Nov. 30, 1994, 718 pgs.

* cited by examiner

FIG. 6

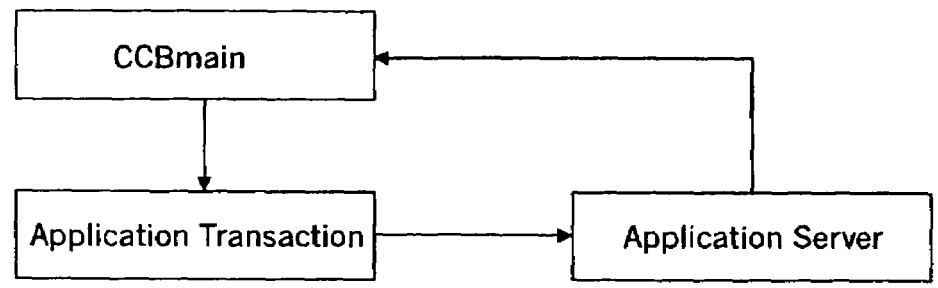

GCCBAAR - Accounting Rule
GCCBAVD - Valued Document
GCCBAMH - Message Handling
GCCBAMP - Multiple Output Put
GCCBACI - Customer Information Build
GCCBAMT - Tx Amount seting
GCCBCND - Tx Accounting Condition Seting
GCCBASD - Special Device Handling Application Server:
1. Trigger by Application
2. Update Core Layer Database
3. Pass Data to CCBmain
4. Parameter Area Defiend by CCBmain

FIG. 7

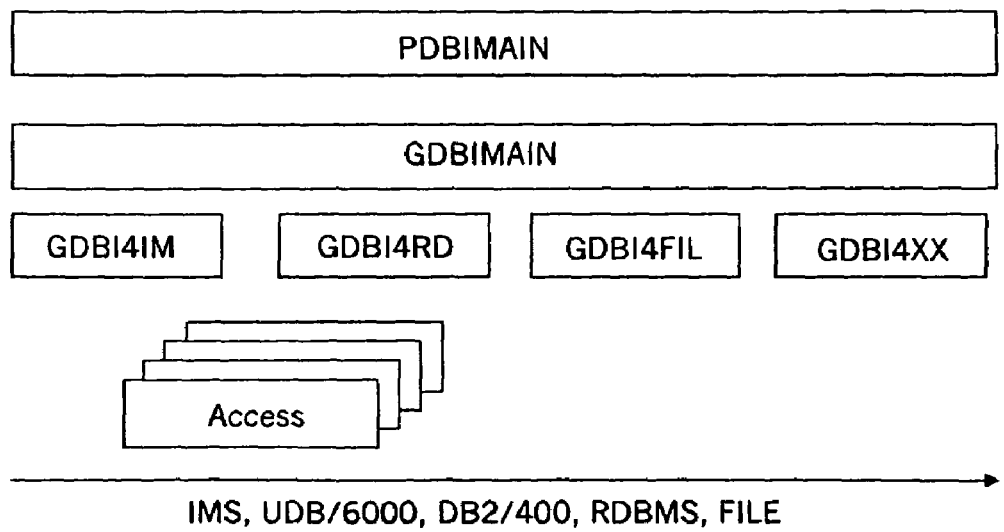

IMS, UDB/6000, DB2/400, RDBMS, FILE

ATM Processing Mode and Time Slot 1. online: Keep business and accounting processing simultaneously
2. offline: Keep temporary accoun
3. mix:     Keep account according to account state
4. 24-hour business according to ATMprocessing:

METHOD AND SYSTEM FOR INTEGRATING CORE BANKING BUSINESS PROCESSES

BACKGROUND OF THE INVENTION

The present invention relates to a banking transaction processing system and more particularly to a method and system for integrating core banking business processes.

With the rapid development of the financial industry, banks can provide more and more products and services than before. Such products and services include, for example, bank card, automatic saving and deposit, automatic transfer, electronic remittance, enterprise banking, home banking, phone banking and satellite banking. All of these are based on the development of information technology. In most cases, computer systems supporting these products and services are developed separately, so data sharing between and among them is difficult. As a result, these products and services cannot provide synthesized information relating to a bank's customers and its business status.

SUMMARY OF THE INVENTION

The present invention addresses the foregoing problems by providing an integrated core banking system and method which includes major core banking products and services, such as saving, time deposit, loan, agency, settlement, credit card/debit card, accounting, electronic remittance, clearance, memo book, customer information, and the like. A payment system, foreign exchange system and investment system may also be included. The modules provided by the system and method of the present invention, which are independent of specific business products or services, also provide a flexible and powerful platform for developing new application systems to support next generation banking products and services.

These and other objects are provided by a system for integrating core banking businesses which includes a business platform for providing application business development in which various processes common to individual core banking business are integrated and core banking business-shared databases for data shared by the individual core banking business are created to provide the system with the ability to synthesize information relating to the business or its customers. This is achieved by analyzing the customer and business data by means of a basic business rule library and a common function library, wherein the basic business is the smallest unit capable of implementing a certain business operation and a common function is a function which is used repeatedly by the basic business. The system further includes an application business subsystem for constituting various specific business by combining the basic business rules.

In addition, the invention provides a method for integrating core banking businesses including the steps of analyzing a business to create a business platform for providing application business development. According to the present method, various processes common to individual core banking business are integrated and core banking business-shared databases for data shared by the individual core banking business are created to provide the ability to synthesize information relating to the business and its customers. Basic business rule and common function libraries are created for constituting various specific business by combining the basic business rules.

BRIEF DESCRIPTION OF THE DRAWINGS

The invention will be understood more fully from the detailed description given below and by reference to the accompanying drawings, in which like designations denote like elements and wherein:

FIG. 6 is a diagram of the work flow of the application server of FIG. 2;

FIG. 7 is a diagram of the database access interface modules of FIG. 2;

DETAILED DESCRIPTION OF THE DRAWINGS

Figure 1:
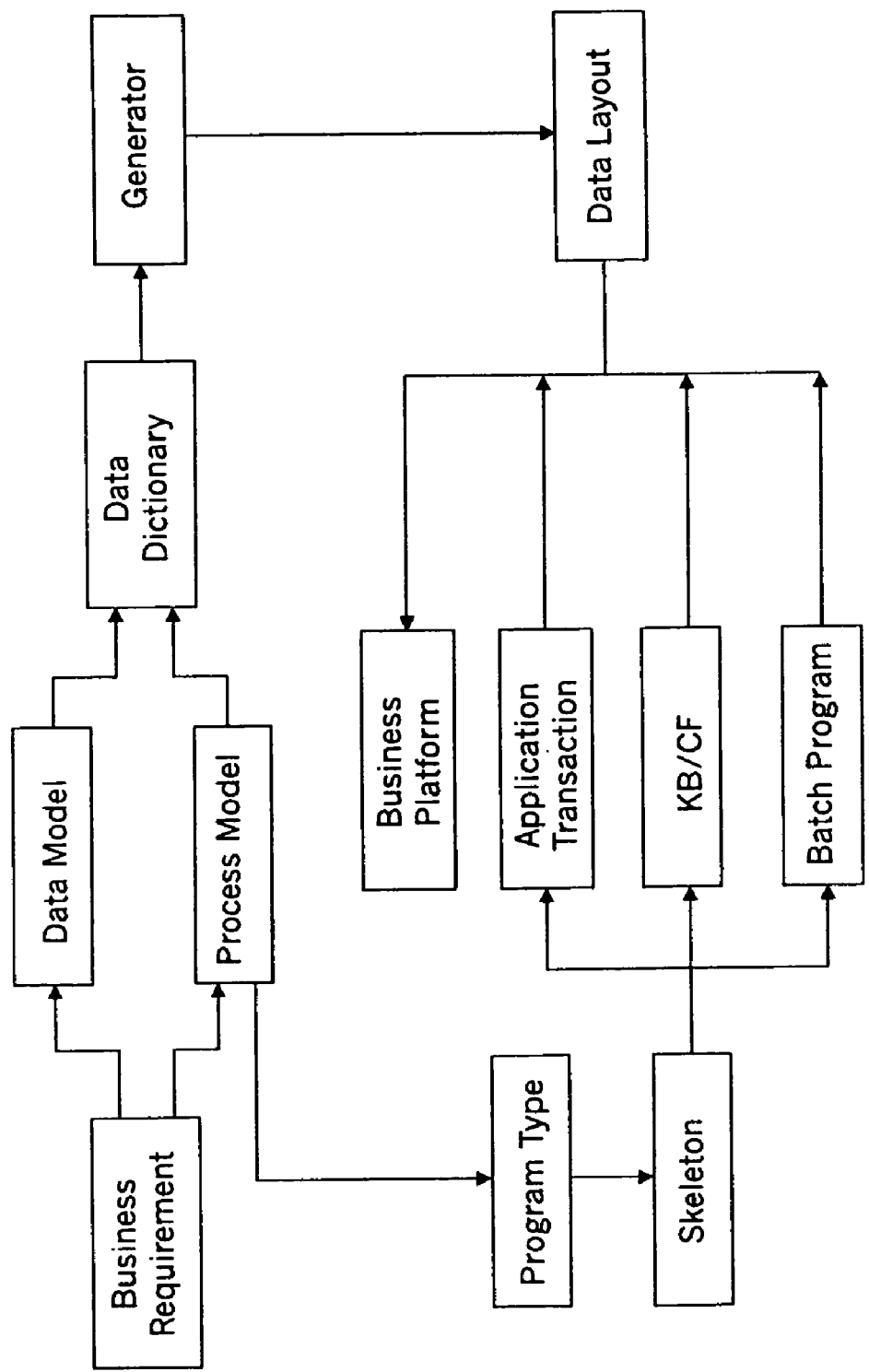
FIG. 1 is a diagram of a system for integrating core banking business according to one embodiment of the present invention.

Referring now to the drawings, there is shown in FIG. 1 an integrated core banking method and system 10 according to the present invention. System 10 employs a data dictionary 12 produced by a data model 14 and a process model 16 of a business requirement 18. A data layout 20 and memory tables (not shown) are created by means of a generator 22 using the output of data dictionary 12. From the data layout 20, a business platform 24 is developed to support a complex application transaction program 26 and to improve the development and maintenance efficiency. In the application transaction program 26, the basic business rules are obtained after analyzing customer and business data, from which the knowledge block and common function library KB/CF 28 is built.

The integrated core banking system 10, and particularly the business platform 24, KB/CF 28 and application transaction 26 subsystems will now be described in greater detail.

To implement the integrated core banking system 10, common system processing and core business management are integrated into the business platform 24. Critical business data, such as customer information, is centrally stored and managed. In this manner, the data can be shared among different business applications. The major modules in business platform 24, which will be described below, include an online control module group, a database interface module (DBIMain), a file interface module (FAIMain), a centercut control module, an online report subsystem, an external interface and a testing driver. The critical processing flows in business platform 24 include an accounting process, error-correction (EC) processing, a twenty-four hour mode and KB trigger processing.

Figure 2:
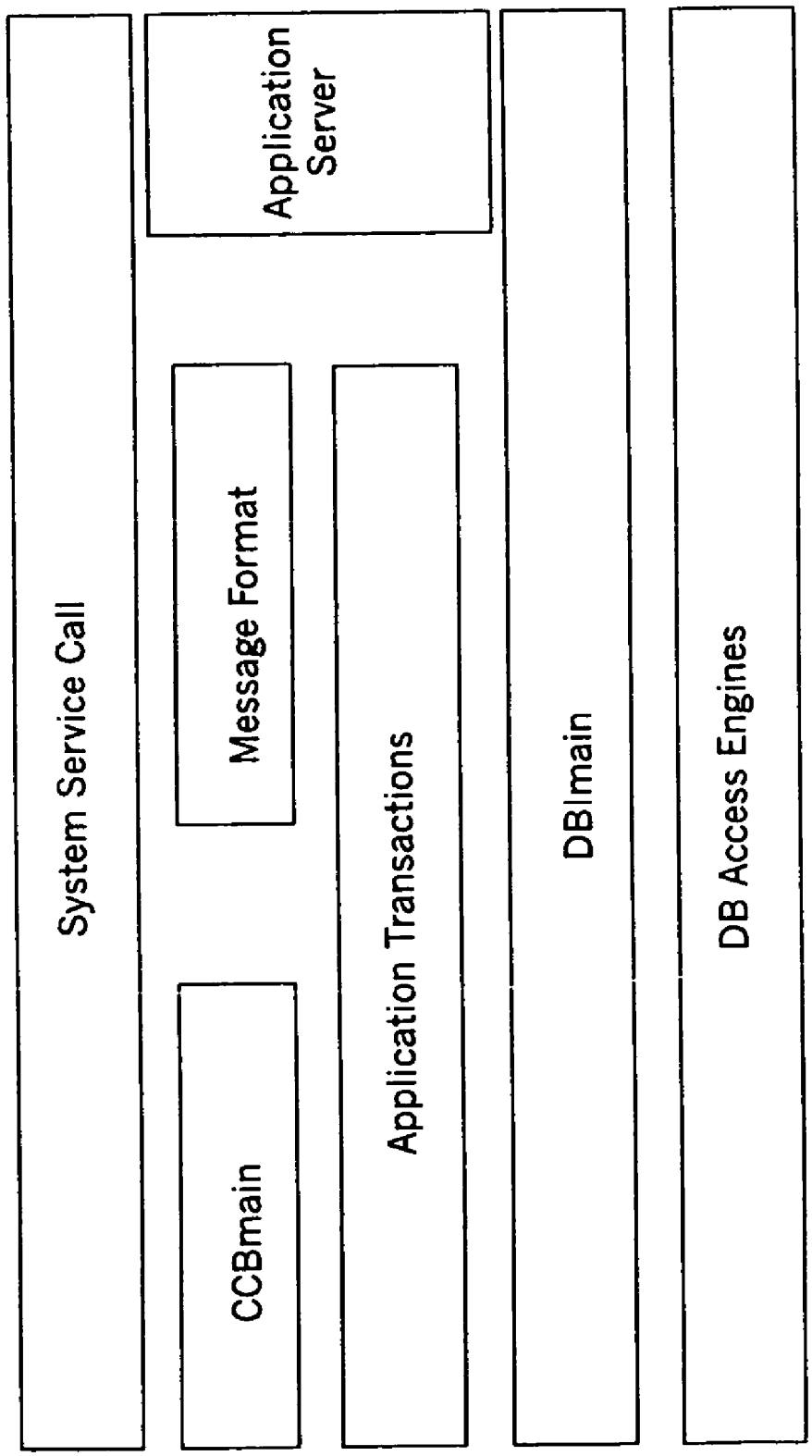
FIG. 2 is a diagram of an online control module group architecture.

Referring now to FIG. 2, there is shown the architecture of an online control module group 30 which is the main control module group for online transaction processing in the core banking system (CBS) 10. In CBS 10, all functions dependent upon a specific platform, such as host, operating system, middleware, communication protocol and database management system (DBMS), are integrated in a System Service Call 32 module and a database interface module DBIMain 34, which provide service to other modules by means of unified and platform independent interfaces. This configuration permits the CBS 10 platform to be independent and adaptable. Other modules in the online control module 30, particularly a CCBmain 36, an application server 38, application transaction program 26 and KB/CF 28, may be written in pure ANSI 86 COBOL. Most programs of CBS 10 are thus completely portable among different platforms. Online control module 30 also includes a message formatter 40 and database (DB) access engines 42.

Figure 3:
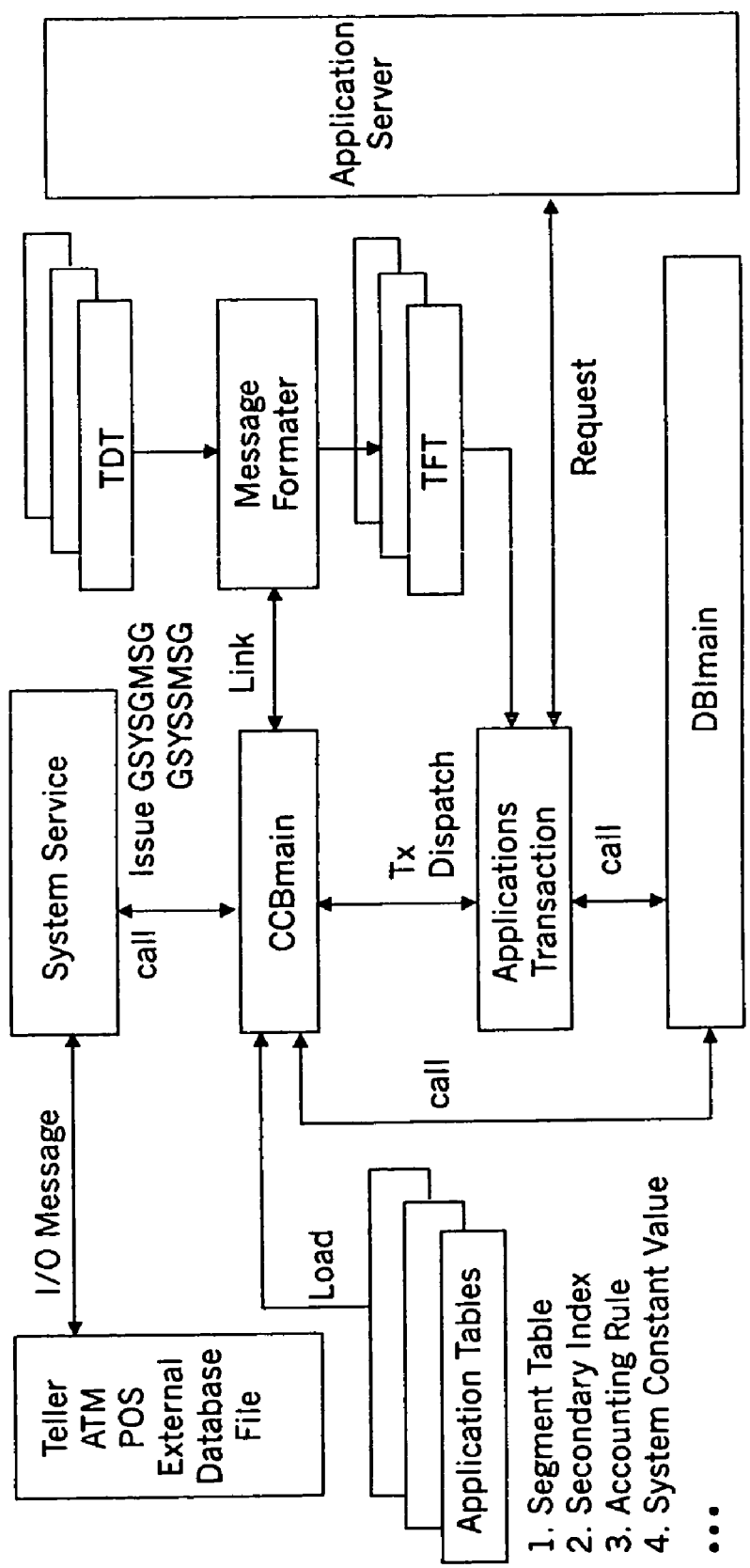
FIG. 3 is a diagram of the online control module group of FIG. 2 and its interconnections to other modules of the system of the present invention.
Figure 4:
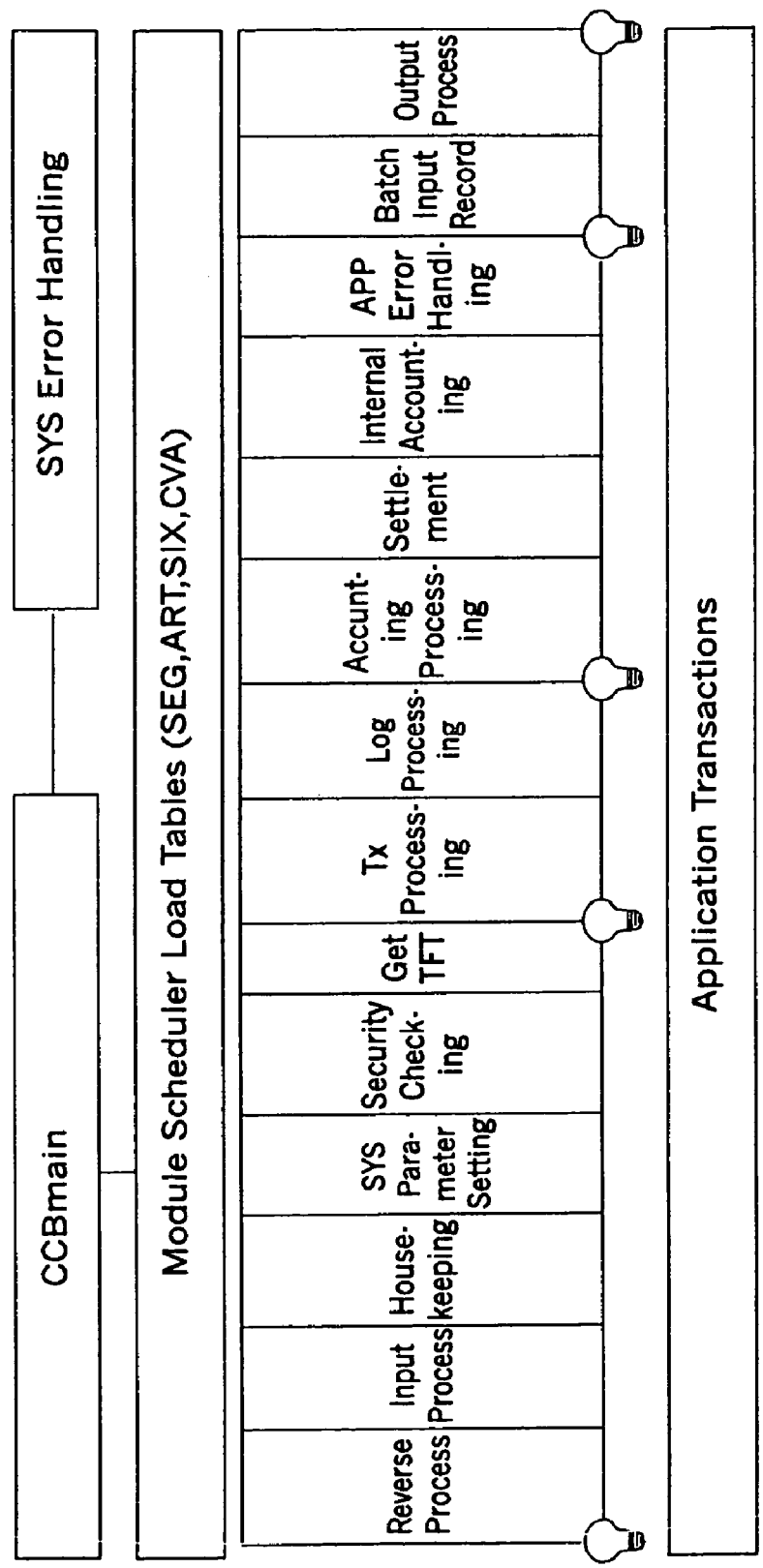
FIG. 4 is a diagram of the functions called by CCBMain module.

Referring now to FIG. 3, the interaction components of online control module 30 will be described in greater detail. Each application subsystem includes a transaction definition table TDT 44, which defines each input field of every transaction belonging to this subsystem, for example, the transaction sequence number among all input fields, data type, length, how it will be transformed and moved to the transaction field table, and the like. Each application subsystem further includes a transaction field table area TFT 46, which includes input fields of all the transactions belonging to this subsystem. The transaction program 26 receives its input data from the TFT 46 of the current subsystem. FIG. 4 shows the functions called by the CCBMain module 36, including system error handling module 47.

Figure 5:
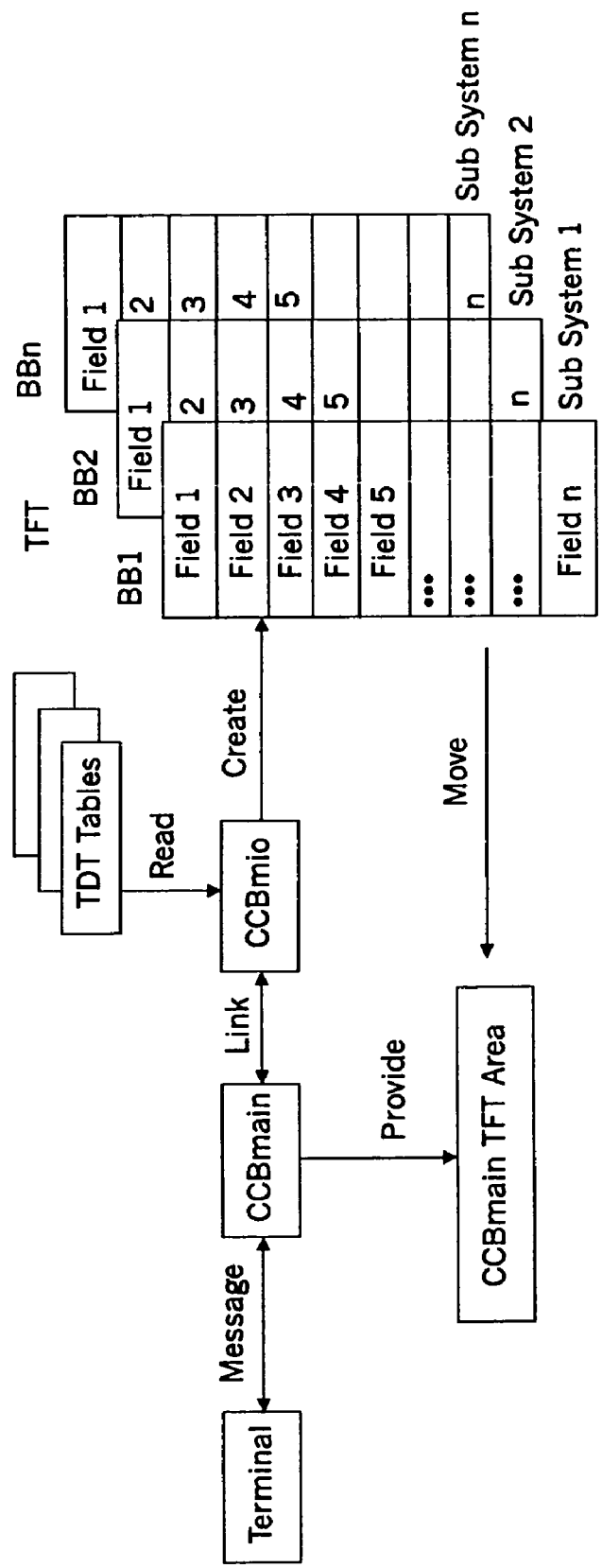
FIG. 5 is a diagram of the work flow of the message formatter of FIG. 2.

Referring to FIG. 5, in operation the message formatter 40 first accesses the appropriate table TDT 44 and searches for the record corresponding to the current transaction. Message formatter 40 then validates the input fields according to TDT 44 and transforms and copies the input fields from the input message area into table TFT 46. As shown in FIG. 6, application server 38 implements core business management functions such as account processing, creating customer information, document management, and the like.

Database interface module DBIMain 34 provides database access service to other modules through a universal interface so that programs in the other modules are not dependent on any special database product. Further, multiple database management systems may be used in one application system. Different databases may be stored in different database management systems according to the application requirements to satisfy special business and performance needs. FIG. 7 shows the components of DBIMain 34. PDBIMAIN 48 is the DBIMain 34 interface and GDBIMAIN 50 is the DBIMain 34 control program. A database interface is provided for each type of database to be accessed, for example, GDBI4IMS 52 is an IMS database service control program and GDBI4RDB 54 is an RDB database service control program. The service control programs interface to the database access engines 42.

Figure 8:
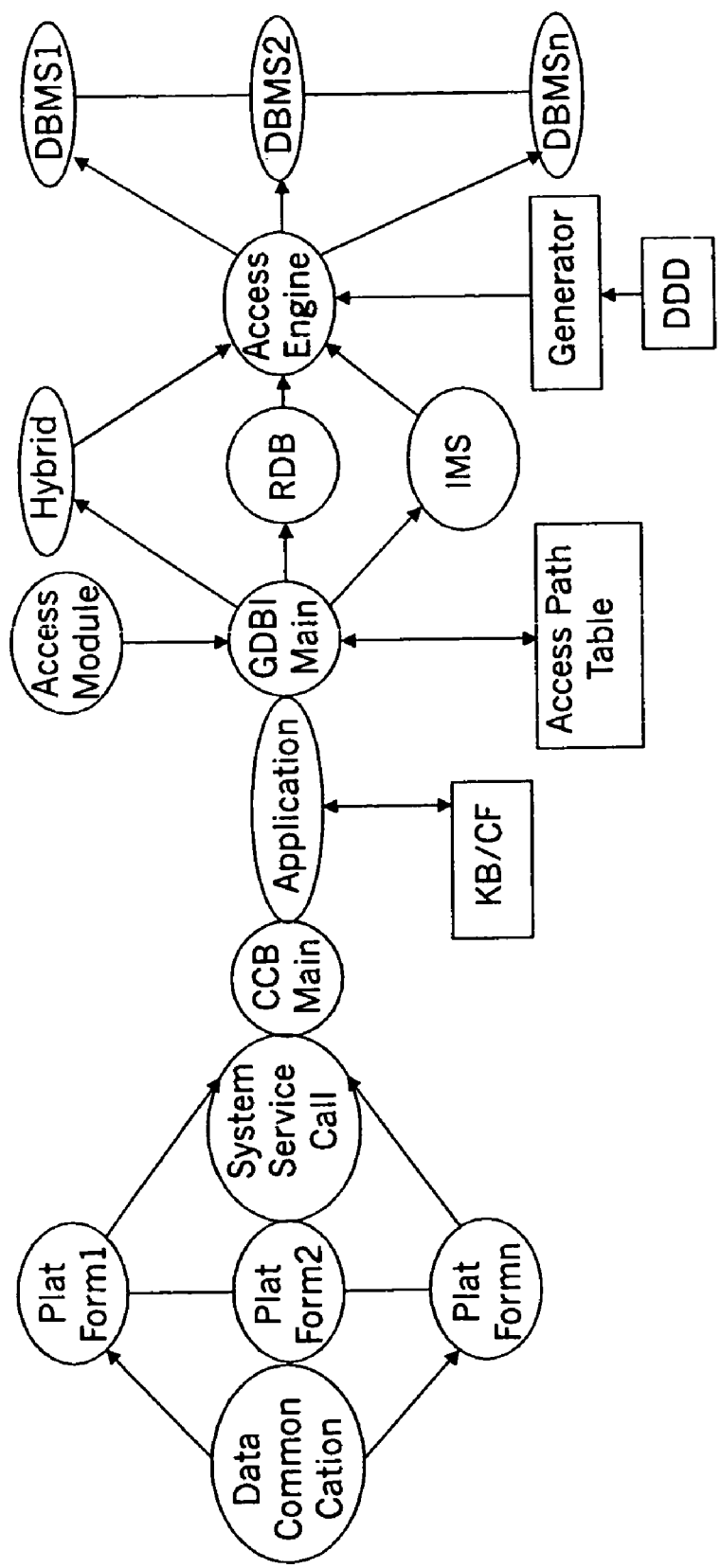
FIG. 8 is a diagram of a complete transaction process model.

The transaction process model may be better understood by referring to FIG. 8, which shows the GDBIMAIN 50 process flow. First, all variables are initialized and the necessary system working area is acquired. Next, input checking is performed, for example, normal field checking, secondary index checking, database name/segment name/field name checking, and the like. Default values are then set for optional parameters. A format database access request is generated and then a selected database DBMS1 ... DBMSn is accessed by means of database access engine 42. The output from the accessed database is received and formatted by GDBIMain 50 and provided to application transaction program 26 to complete the process. Errors are processed by system error handling module 47 as shown in FIG. 4. The transaction process described above is effectively carried out by creating the following tables and system working areas: TDBISIDX, a secondary index search table for checking the existence of a secondary index and obtaining the corresponding database name and database sequence; TDBISSEG, a segment search table for checking database name, segment name, and field name, and obtaining the name of the root segment and key word; CBAPHARE, an access path area for storing the current database access path. The current access path is determined by the database operations within the current transactions. GDBI4RDB 54 determines the actual database operation to be performed according to the CBAPHAARE area and PDBIMain 48 parameters. The architecture of GDBIMain 54 and the design of access engine 42 permit additional database accessing functions, for example, join, sum and complex inquiries, to easily be added.

Figure 9:
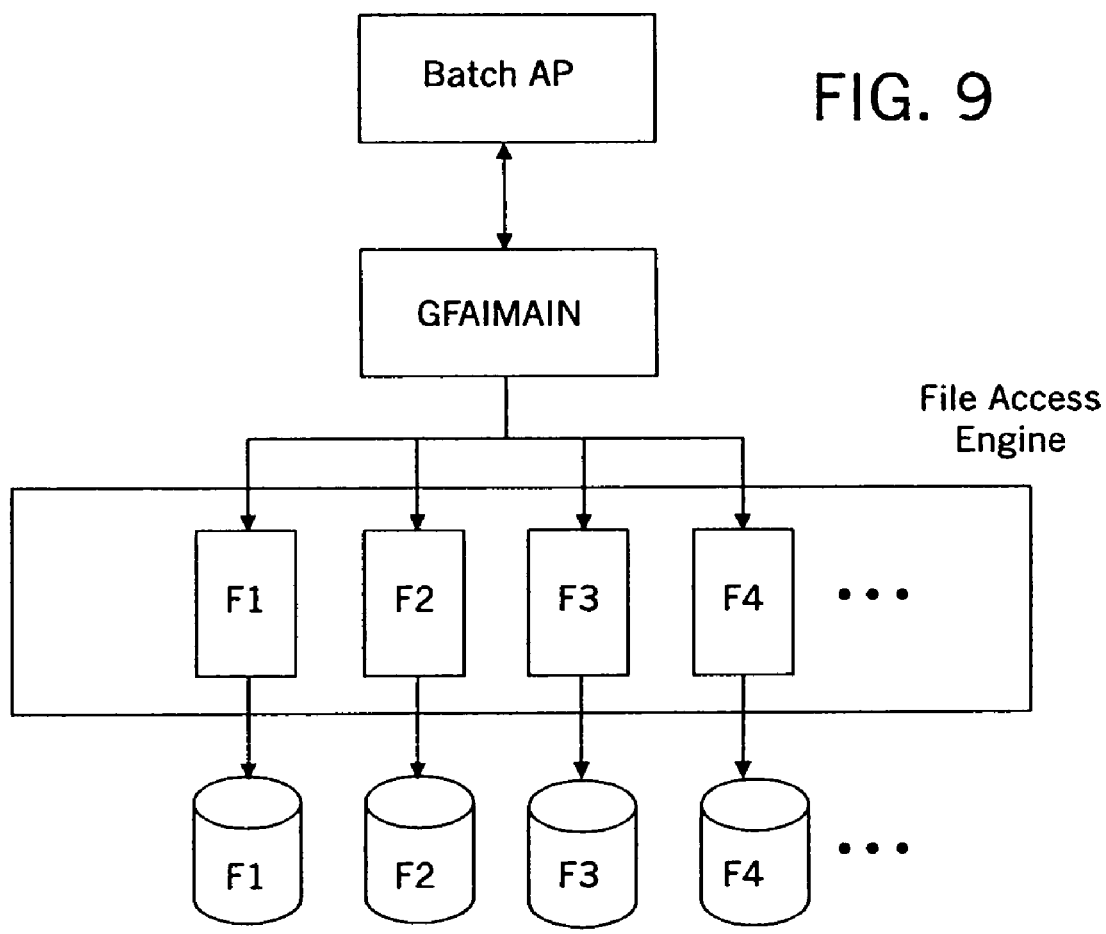
FIG. 9 is a diagram of a file access interface module.

Referring to FIG. 9, there is shown the functional diagram of a file access interface module FAIMain 56. Module 56 provides file accessing service to other modules, particularly batch job applications or programs 57, by means of a unified interface GFAIMAIN 58. FAIMain 56 is configured to permit a batch application 57 to operate independently of the type file system 59 to be accessed. A file access engine 60 implements access to each file. File access engine 60 provides file access commands by means of access generators 62. Without modifying an application program, access commands with different functions can be generated by modifying the parameters of generator 62 or extending its function.

Figure 10:
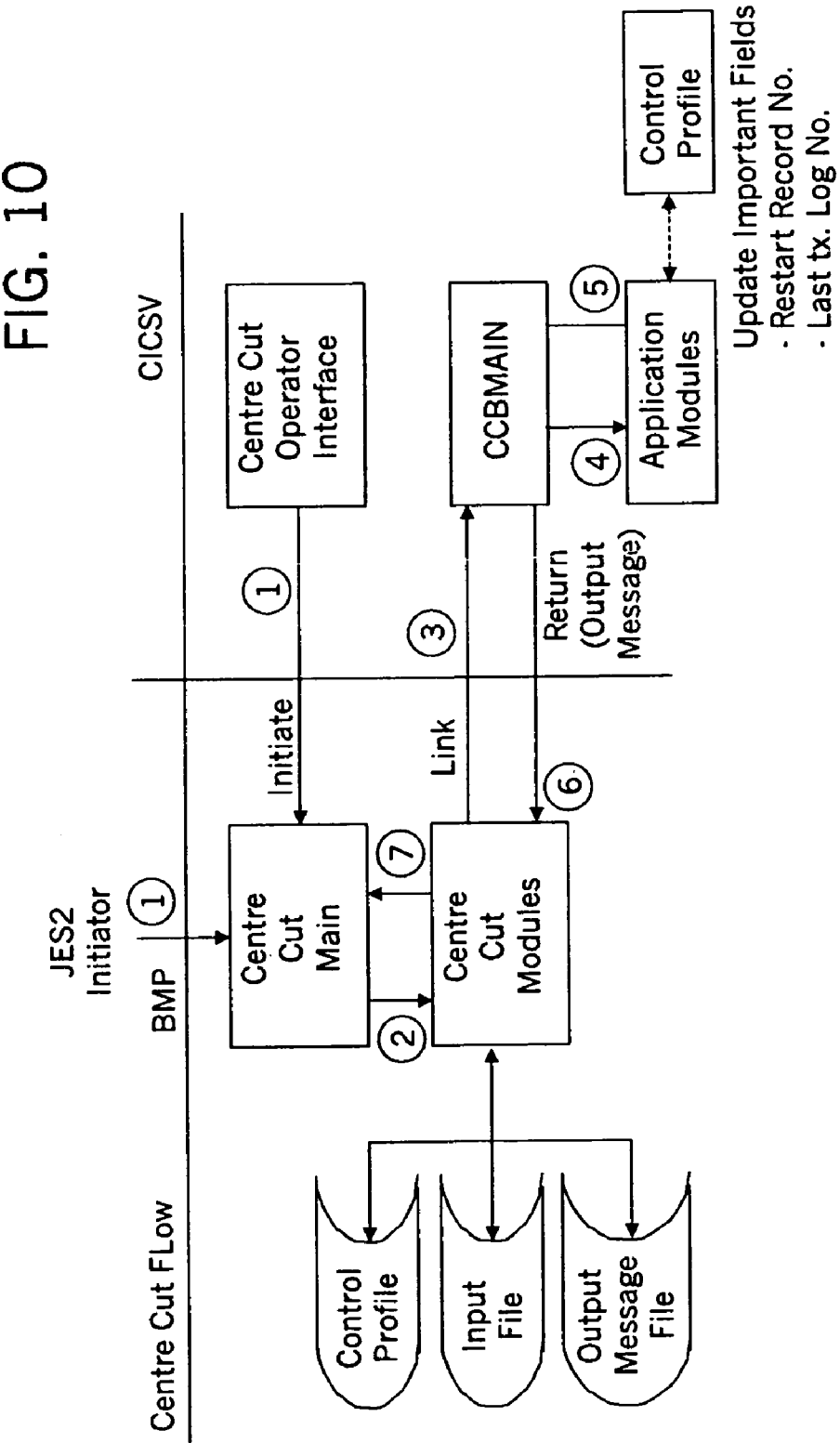
FIG. 10 is a diagram of a centercut process model.

Batch jobs such as automatic batch transfers are processed by a CenterCut control module CC 64, whose architecture and operation is shown in FIG. 10. CC 64 uses online transactions and can be invoked by JCL, CICS transaction TCCC or online transactions by means of a GCCBAJB application server. CC 64 calls an appropriate module 66 to process a CenterCut command, reads a CenterCut input file 68 record by record, and then sends a request to CCBMain 36 to invoke the appropriate online transaction to process each record. CCBMain 36 executes the online transaction requested by the CenterCut job by means of application transaction module 26. After the online transaction is completed, CCBMain 36 updates the appropriate fields in a CenterCut control profile 70 according the processing result. CCBMain 36 returns the transaction processing result to CenterCut control module CC 64 via module 66. Next, CC 64 writes an output record into an output file 72 and updates the processing status in input file 68, and the appropriate fields in a CenterCut control profile 70. After all records in input file 68 have been processed, the CenterCut job is complete. If the CenterCut job is invoked by TCCC, the CenterCut control program will, if necessary, indicate whether the processing is successful or not to a CICS operator interface console 74.

A CenterCut command is passed to the CenterCut control program in CC 64 when a CenterCut job is invoked. Different functions will be performed for different commands, for example:

Start=normal start

Restart=a specific record in input file 68 can be specified as the restart point Pause=when a specified number of records in input file 68 have been processed, pause the CenterCut job for a specified period, then resume processing Recover=after an abnormal end of the command processing, recover the input file 68, output file 72 and control profile 79 to prepare for a restart Change=adjust the pause parameters in CenterCut control profile 70

Display=display the current contents of CenterCut control profile 70

Stop=stop the current CenterCut job processing.

The restart procedure allows a CenterCut job to be resumed after it is terminated by an operator or abnormally ends. The record in input file 68 from which the job restarts can be specified by a parameter of the restart command. If this parameter is omitted, the CenterCut job restarts from where it was terminated.

Under some exceptional conditions, for example, if the link between the CenterCut control module 64 and online control module 30 is broken after the online control module 30 has successfully executed a transaction, the CC 64 may fail in writing the output record 72, updating the process flag in input file 68, or updating fields in the CenterCut control profile 70. In this case, if the job is restarted immediately, some output records can be lost and the status of some input records can be incorrect, causing subsequent jobs to fail. If this occurs, the recover process can recover the output record, the process flag of the input record and specific fields in the control profile according to the last processed record number and transaction log number recorded in the CenterCut control profile 70. When a CenterCut job abnormally ends, the recover process must be performed before a successful restart can be accomplished. The process status and cause of the interrupt is stored in the process status field of the CenterCut control profile 70.

In the recover process, the transaction log number of the last processed record is retrieved from the CenterCut control profile 70 and the output message of the transaction is retrieved from a voucher reprint database BCMVOHD according to the transaction log number. Whether the output message of an online transaction will be written into the voucher reprint database is determined by a flag in a transaction profile database BCMTXPD. For a CenterCut job that needs to be recovered, the flag of the corresponding online transaction is set before the CenterCut job starts. Next, the output record of the last processed record is checked to determine if it has been written into the output file 72. If not, an output record is created from the output message in BCMVOHD and written into the output file 72. Finally, the necessary fields of the input record and the control profile are recovered from input file 68 and control profile 72.

Error correction in the CenterCut process is accomplished by executing another CenterCut job. Error correction CenterCut jobs follow the same process steps of other CenterCut jobs. When a request is made to CCBMain 36 to execute an error correction transaction, each record in the input file 68 of the transactions of the last normal CenterCut job is retrieved and becomes an input record of the error correction job. A CenterCut module GCCBCEC (not shown) generates the input file of the EC CenterCut job according to the output file of the normal one.

Figure 11:
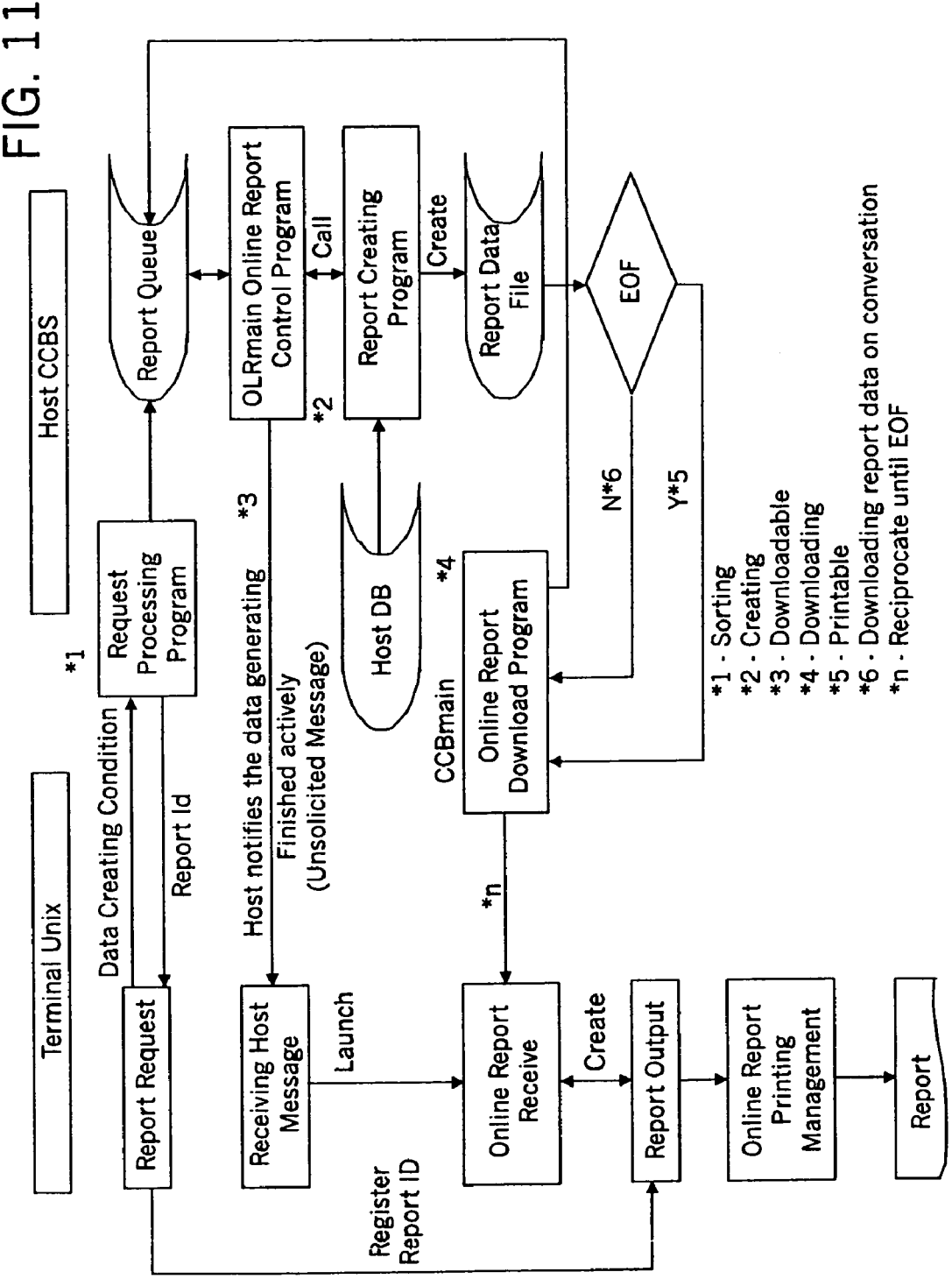
FIG. 11 is a diagram of an online report process flow.

Referring to FIG. 11, there is shown the process flow for creating online reports in the system of the present invention. In step *1 a print request is sent from a terminal 76 to a report generating queue 78 in the host core banking system 10. After the report is generated in step *2 by a report creating program 80, host 10 notifies terminal 76 in step *3 to download the report and manage the printing. CCBMain 36 controls the downloading of the report to terminal 76 as indicated by step *4 and the process is repeated, as indicated by step *n, until downloading is completed. A scheduled report may be created by the process shown in FIG. 12. in which predetermined selected reports are generated upon request by terminal 76.

Both online and scheduled report requests may be handled on a first-in first-out basis. In one embodiment host 10 only generates raw data, with the report format, paging, sum and field editing, for example, being handled by terminal 76. Host 10 may store the report processing status, for example, in queue, processing, ready for download, downloading and ready for printing. Upon detecting an error host 10 sets the status to abnormal. Terminal 76 may be configured to process print related functions, including status inquiry, report content inquiry, print, reprint, print number control, delete, security control, statistics, and the like. If terminal 76 detects that the report generating status of host 10 is ready to download but it does not receive the data, terminal 10 may directly start an online report download transaction.

Figure 13:
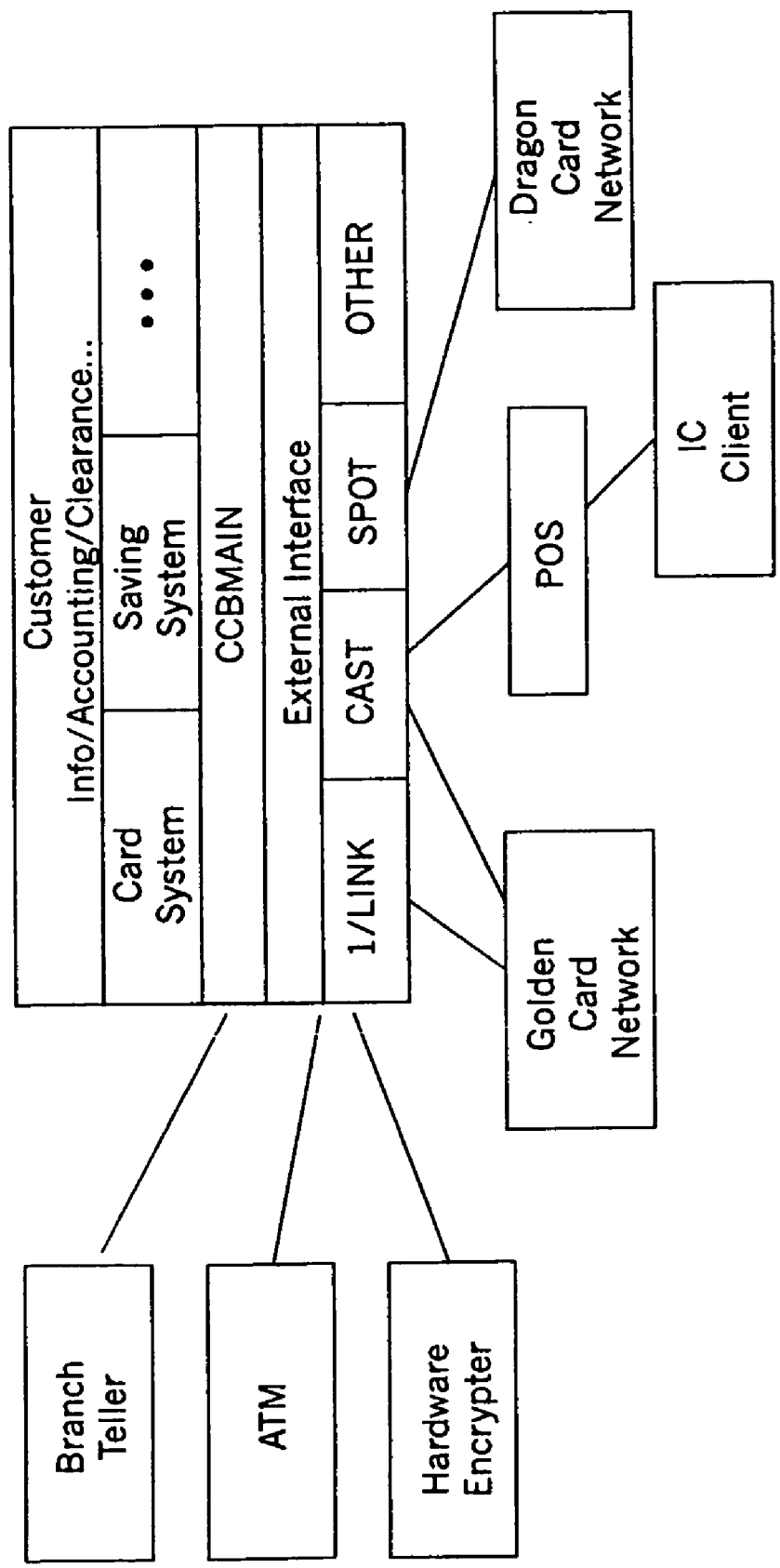
FIG. 13 is a diagram of an external interface module.

Referring now to FIG. 13, there is shown the interconnection of system 10 to external functions and systems/servers by means of an external interface module 82 connected to CCBMain 36. External interface module 82 is configured to control the interface of 1/LINK, CAST, SPOT, OTHER subsystems. In operation, an application transaction program 26 requests an external application server, for example ATM 84, through CCBMain 36 to drive external interface module 82. In the other direction, module 82 initiates a CCBMain 36 operation via a CICS link. The format of the input/output parameters follow the standard input/output parameters for the online transaction.

Figure 14:
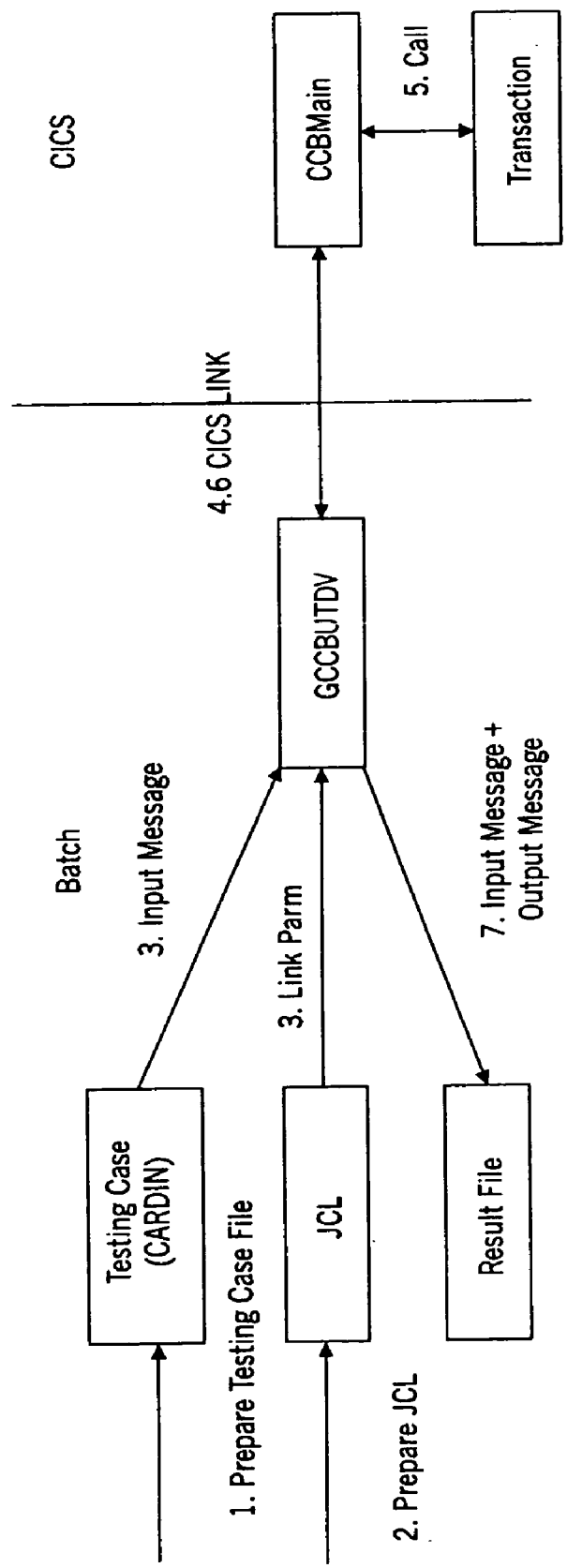
FIG. 14 is a diagram of the testing driver work flow.

Program unit testing is performed by a testing driver 86 as shown in FIG. 14. A unit testing JCL invokes testing driver 86, which sends a request to CCBMain 36, which in turn simulates the online environment to run the program to be tested. The input parameters of the program to be tested are set within a unit testing case file 88. An input message of the program to be tested is first prepared in testing case file 88 in a standard input message format. A JCL 90 of the testing cases 88 is then prepared according to a JCL template. JCL 90 includes the parameters (Link Parm) for a testing driver program 92 (GCCBUTDV), which includes the organization identifications for the teller, terminal, business, CICS system and CICS program. Testing driver program 92 then acquires the Link Parm parameters and the input message from JCL 90 and the testing case file 88. If the Link Parm is not a NULL, its value will overlay the corresponding field of the input messages. Testing driver program 92 next initiates a CCBMain 36 operation using a CICS LINK, and transfers the input messages to CCBMain 36. The format of the input message is identical with the format used when executing transactions from a terminal. CCBMain 36 triggers the transaction application program 26 according to a transaction code in the input message. Having completed the transaction, transaction program 26 returns the results to CCBMain 36, which transfers the processing results to testing driver program 92 in the standard output message format. After receiving the processing results, testing driver program 92 formats the received data and outputs it to a standard output device, for example a testing result file 94. Testing result file 94 also includes the input messages in character and hex formats.

Figure 15:
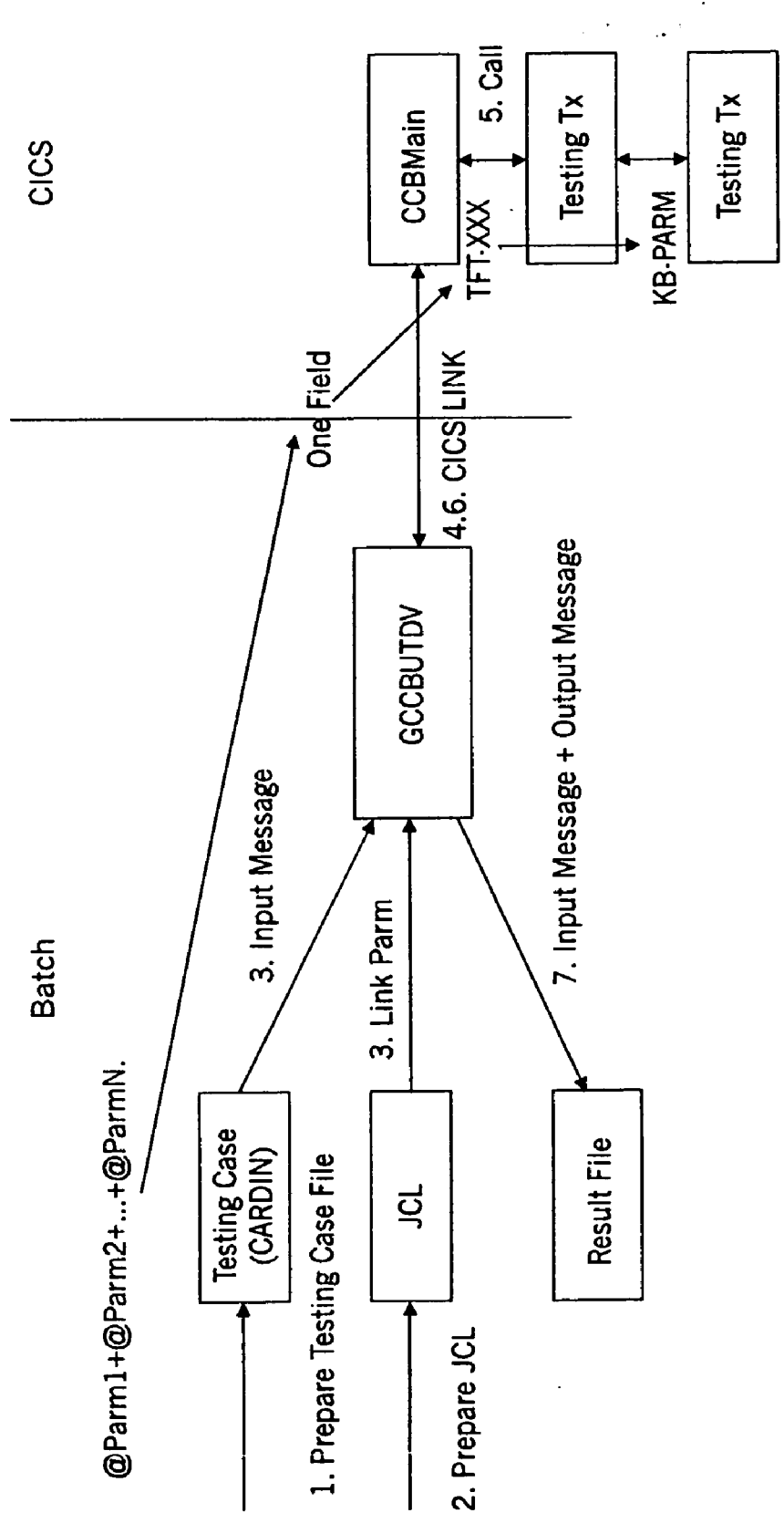
FIG. 15 is a diagram of the KB/CF unit testing work flow.

FIG. 15 illustrates the process by which testing driver 86 tests knowledge base/common function library KB/CF 28. As described above, in the testing case file 88 the value of each parameter of the testing case is set. A character such as "@" may be used to begin each value so that testing driver program 86 will concatenate all of the values into a single input field which is transferred to CCBMain 36. CCBMain 36 saves the field containing KB/CF parameters in a corresponding field of the transaction field table TFT 46 area and launches the testing transaction. The testing transaction calls the tested KB/CF 28 and transfers the field in the TFT 46 area to the KB/CF 28 as the parameters.

The core banking system CBS 10 of the present invention accomplishes accounting processing using accounting application servers. These application servers provide a unified interface for transactions and a knowledge base to generate accounting entries and accomplish accounting processing. This provides simple and straightforward accounting processing and improves system flexibility. In general, referring to FIG. 16, an accounting application server 96 handles accounting processing. When the accounting system employing server 96 is changed, only the accounting server 96 needs to be adjusted accordingly, while the transaction program 26 or KB 98 needs no or only minor alteration. This reduces the cost of the design and maintenance and ensures the quality of the system. Maintenance and adjustment of the system is further facilitated by storing accounting rules in several system tables. When accounting rules change, such as the merging or splitting of account codes, no change will normally be needed to the program source code. Interfaces to the accounting application server 96 are simple and standard, which reduces the likelihood of faults such as KB 98 incorrectly setting the parameters. Accounting server 96 checks the balances of the entire set of accounting information. If an error occurs, CCBMain 36 generates error codes and explanations, from which a user can determine the source of the error.

Account codes are predefined in an account code table and stored in BCMMSCM (not shown. The record content includes:

Account Code: a 4-2-2 three-layer accounting architecture. The three-layer architecture consists of a 4-byte first layer account code, a 2-byte second layer account code, and a 2-byte third layer account code;

Account Code Name: the name of the account code in one or more languages;

Account Code Property: whether the account code is an asset, liability, or the like;

Financial Property: the account code is a normal one or a government policy oriented account code;

Balance Direction: whether the balance is credit or debit, or the like;

Usage Level: which department can use the account code, for example, a branch or sub-branch;

Account code Status: whether this account code is useable or not;

Property Flags: each account code has a set of flags which indicate its characteristics; the flags are stored in the account code table;

A set of flags in the account code table which describe the properties of the account code includes: multiple-currency support; multiple-organization support; in/off account code; general ledger; inter-account; reconciliation such as account suspend/release; and internal/external clearance to support multiple layer clearance.

Figure 16:
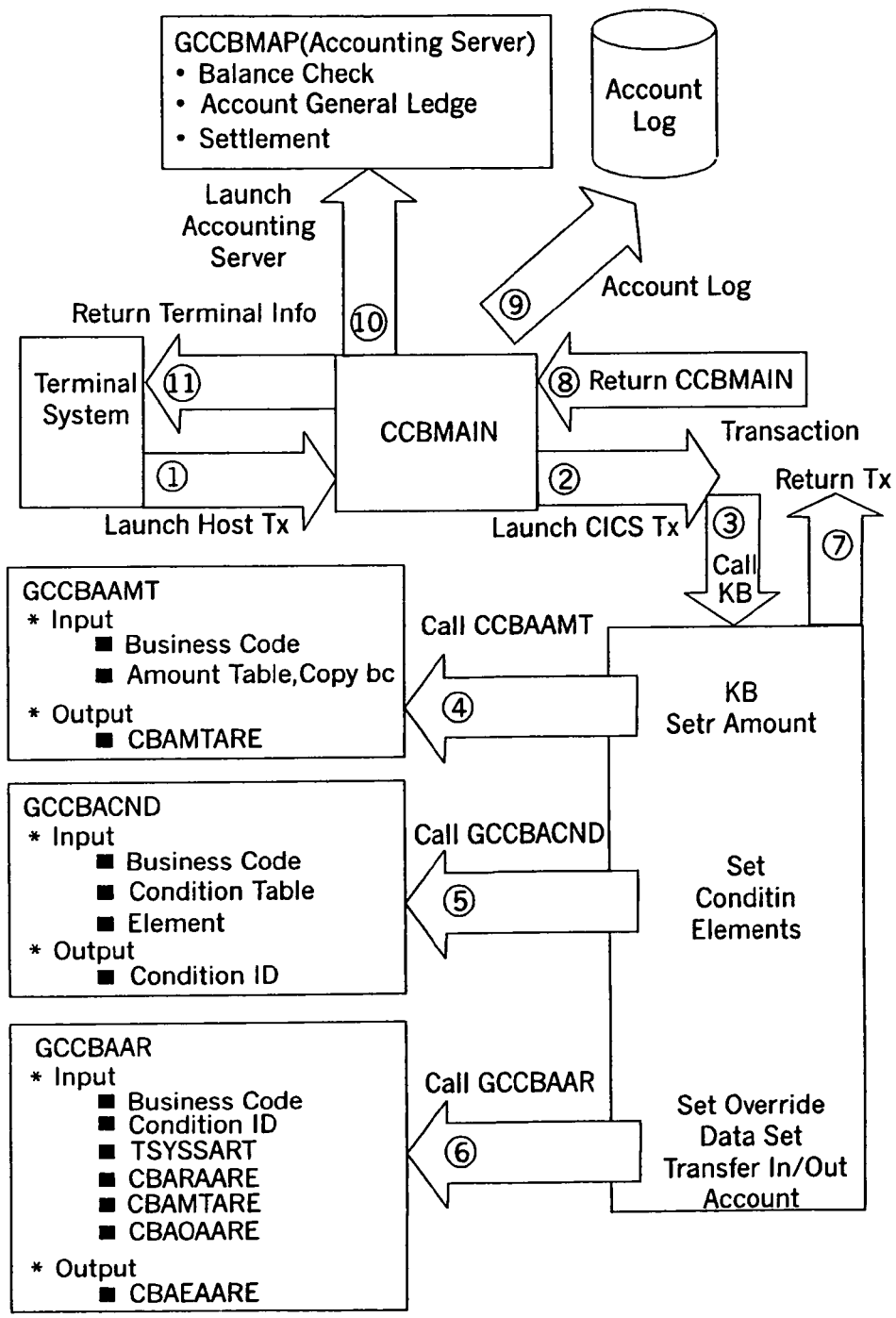
FIG. 16 is a diagram of an accounting process model.

The system tables and working areas needed to support and enable the accounting system are:

TSYSSART or accounting rule table in accounting rule application server GCCBAAR 100 in FIG. 16; TSYS-SART maintains the accounting rules of all transactions and KB 98; an accounting rule can also be overridden by an application program;

TSYSSOVT or account codes override table, for dynamically generating account codes of selected accounting entries according to runtime business conditions. This reduces the redundancy of the accounting rule table;

TSYSSCND or accounting condition table, which maintains the correspondence between the business condition and the set of accounting entries to be generated. Accounting server 100 uses this table to determine which set of accounting entries in TSYSSART are to be generated according the runtime business conditions;

TSYSSAMT or accounting amount table in accounting amount application server GCCBAAMT 102, which defines the names of amounts, such as account balance, interest, and the like, that an application program must provide to accounting server 96 to calculate the amount of each accounting entry;

TSYSSSMP or settlement type table which defines the settlement types supported by the system and the sets of accounting entries for them;

TSYSSIAT or inter-account number override table, which is used to generate inter-account numbers dynamically according to an account code and business condition;

CBAIFARE or application interface area in which the transaction or KB 98 returns the data relating to the application to CCBMain 36. During accounting processing, KB 98 sets related data in this area, such as reference identification, transaction type, account book number, debit and credit account numbers, and the like, for CCBMain 36 to process;

CBAMTARE or accounting amount area in server 102, in which the application program stores those amounts defined in TSYSSAMT so that the accounting servers can calculate an amount for each accounting entry;

CBARAARE or accounting rule area in server 100, which stores the set of accounting entries that accounting servers find in the TSYSSART table according to the runtime conditions;

CBAOAARE or account entries override table in server 100 which is used by the application program to override selected fields in CBARAARE, for example, the account code; and CBAEAARE or transaction account entries table in server 100 which stores the accounting entries generated for the current transaction. The content of this area will be used to update accounting databases and it will also be recorded in a transaction log.

Accounting application server 96 further includes an accounting condition application server 104 to store the TSYSSCND condition table.

As will be understood by those skilled in the art, accounting processing is the procedure by which an online transaction accesses accounting application servers to generate account entries and the amounts of account codes, then update the balance of appropriate account codes during the batch processing. Transaction details for the account codes are created from a transaction log.

CCBMain 36 controls the entire process of accounting processing according to a preferred embodiment of the present invention. When CCBMain 36 receives a transaction request from a terminal 106 as shown in FIG. 16, CCBMain 36 first initializes the necessary system working areas or tables CBAAOAARE, CBAEAARE, and then initiates the corresponding transaction for application processing. The transaction may also launch one or more KB 98. Both the transaction and KB 98 may generate accounting entries, which are stored in CBAEAARE. After the transaction processing is completed, CCBMain 36 calls accounting processing main program GCCBMAP in accounting application server 96 to conduct balance checking, update the balance of account codes, and other accounting processing, and then record accounting entries in an account or transaction log 108.

A transaction or KB 98 calls accounting amount application server 102 to provide all accounting amounts in area CBAMTARE, which will later be used to calculate the amount of each account code's accounting entries. Accounting condition application server 104 searches the TSYSS-CND table to obtain the sequence number of the set of accounting entries to be generated in TSYSSART according to the runtime business conditions. A business condition is determined by the values of a set of predefined condition factor fields. Accounting rule application server 100 generates the accounting entries according to the sequence number from server 104, the values from areas CBAOAARE and CBAMTARE in server 100, clearance factors, and the like, then stores the accounting entries in CBAEAARE in server 100.

The accounting processing main program GCCBMAP verifies the accounting entries generated during the transaction. If no error is found, GCCBMAP updates appropriate accounting databases, such as balance of account code, accordingly.

The accounting processing flow according to one embodiment of the present invention will now be described. The process steps indicated by the numbers within the circles in FIG. 16 are:

1) Terminal system 106 sends a transaction request to the host.
2) After CCBMain 36 is launched, CCBMain 36 checks the input message, performs necessary preprocessing, then invokes the appropriate application transaction to process the request.
3) If the transaction does not call a KB 98, the transaction will create all account entries by calling appropriate accounting application servers.
4) KB 98 sets the accounting amount area CBAMTARE in server 102, then provides the values of the appropriate account amounts into the accounting amount area CBAMTARE.
5) KB 98 calls accounting condition server 104 to set the accounting conditions, then searches for a matched record in TSYSSCND which includes the sequence number of a set of accounting entries in TSYSSART. As described above, a business condition is represented by some business related information, for example, deposit type, transaction type, deposit period, or the like, in predefined data fields. A business condition is set by setting the values of appropriate ones among these data fields.
6) KB 98 calls accounting rule server 100. Each record in TSYSSART is a sequence number and an expression. The expression has the format of ({field1 op value1) and (field2 op value2) and .... and (fieldn op valuen)...}. Fieldn is the data field mentioned above. op can be >, >=, =, <=or not=. While the values of data fields that transaction or KB 98 provides to satisfy the express of one record in the TSYSSART, server 104 stores the sequence number in a system working area. This number will be used to generate accounting entries in later steps. Server 100 searches the set of accounting entries appropriate in TSYSSART according to the sequence number obtained by server 104. An application can override certain fields of these accounting entries by using CBAOAARE. Additional settlement accounting entries may also be generated according the settlement condition of the current transaction. The complete set of accounting entries for a transaction includes accounting entries for the one or more KBs 98 it calls and those of itself.
7) KB 98 next returns control to the transaction program 26 after KB 98 completes processing and accounting entries are generated.
8) The transaction program 26 returns control to CCBMain 36.
9) The accounting processing main program GCCBMAP verifies the accounting entries generated.
10) CCBMain 36 launches GCCBMAP in server 96 which instructs CCBMain 36 to update the appropriate accounting databases and write the results to transaction and account log 108.
11) CCBMain 36 returns the output message to terminal 106

Figure 17:
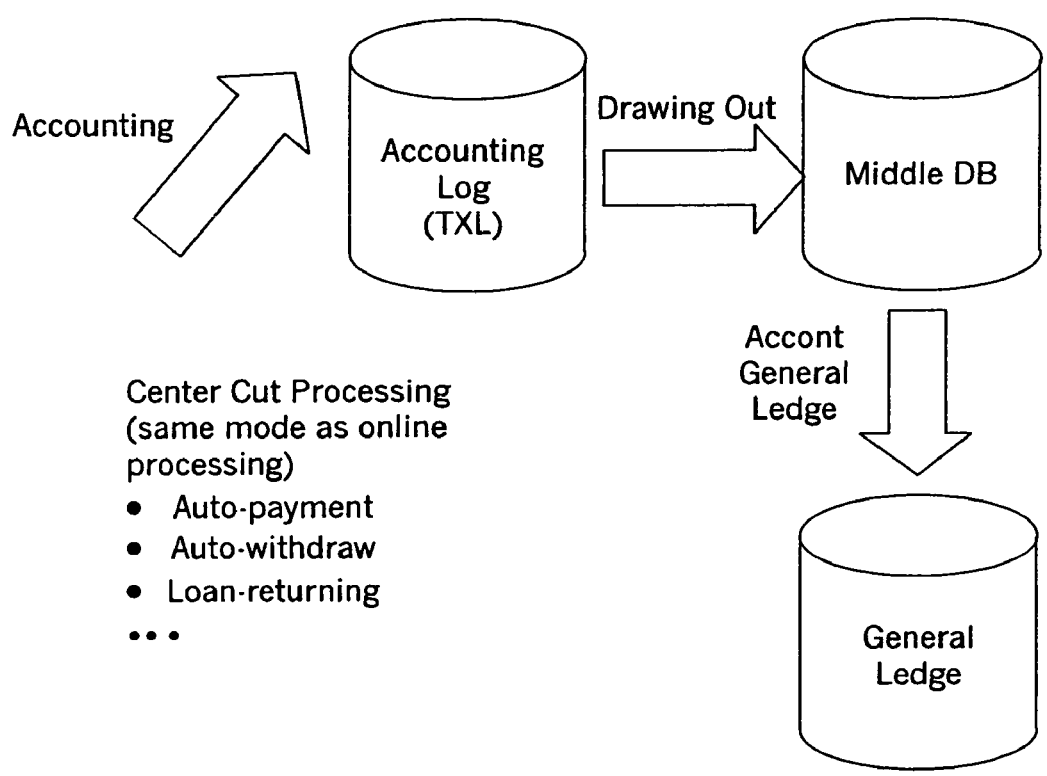
FIG. 17 is a diagram of a general ledger process model.

Referring to FIG. 17, batch account processing according to one embodiment of the present invention is provided by building the transaction details for each account code from transaction log 108, after which a general ledger database 110 is updated. General ledger processing is carried out according to the process described above and as shown in FIG. 16.

Settlement is an important function for a bank in order to do business with other banks and financial institutions. For each transaction related to external organizations, some unique information must be generated and recorded in order to track the accounting relationship between the bank and the external organizations. Such information is critical for follow-up processing and other business functions. Settlement processes vary among banks. In the core banking system of the present invention the settlement system is hierarchical. A branch conducts settlement with other branches via a settlement center and sub-branches conduct settlement with other sub-branches through a common branch. Any organization within a bank may conduct settlement with external organizations through the settlement center, which is the root of the hierarchical settlement tree.

The process of settlement includes the steps of collecting data and calculating accumulated settlement balances. In the present core banking system, settlement data is collected from settlement accounting entries. Each transaction involving multiple organizations will produce settlement accounting entries reflecting the settlement between the respective organizations. Account codes in settlement accounting entries are used exclusively for settlement purposes. During the accounting processing of a transaction and KB 98 as shown in FIG. 16, accounting rule server 100 determines whether settlement has occurred according to selected fields in an AIF area filled in by KB 98. These fields include a transfer in account number AIF-TR-IN-ACCOUNT and a transfer out account number AIF-TR-OUT-ACCOUNT. If settlement occurs, accounting entries are generated using a settlement type table TSYSSSMP, which defines all supported settlement types and sets of accounting entries that can be generated by each type. Settlement accounting entries are stored in CBAEAARE in server 100 along with other accounting entries. The follow-up processing on settlement accounting entries is the same as the processing for normal accounting entries.

Errors, for example, a transaction that is executed by mistake because of an incorrect teller operation, may be corrected executing a subsequent "reverse process" to recover and correct the effects or the erroneous transaction. The error correction process recovers the effects on application databases caused by a transaction, recovers and updates account code balances performed by the transaction, print error correction vouchers and performs other business specific functions as necessary. CCBMain 36 and transaction/KB 98 cooperate to achieve error correction. According to the data in transaction log 108 for the normal transaction to be corrected, CCBMain 36 obtains the necessary data for an error correction transaction, including the input terminal message, transaction request area, KB 98 request areas, TGS area and accounting entries. CCBMain 36 then conducts the accounting processing reverse to that of the normal transaction. The transaction or KB 98 recovers the application databases and completes other business related processing according to the information prepared by CCBMain 36. The same transaction or KB 98 program is called to error correct the original transaction. Each transaction or KB 98 program includes two separate processes, one for normal processing and one for error correction processing.

Figure 18:
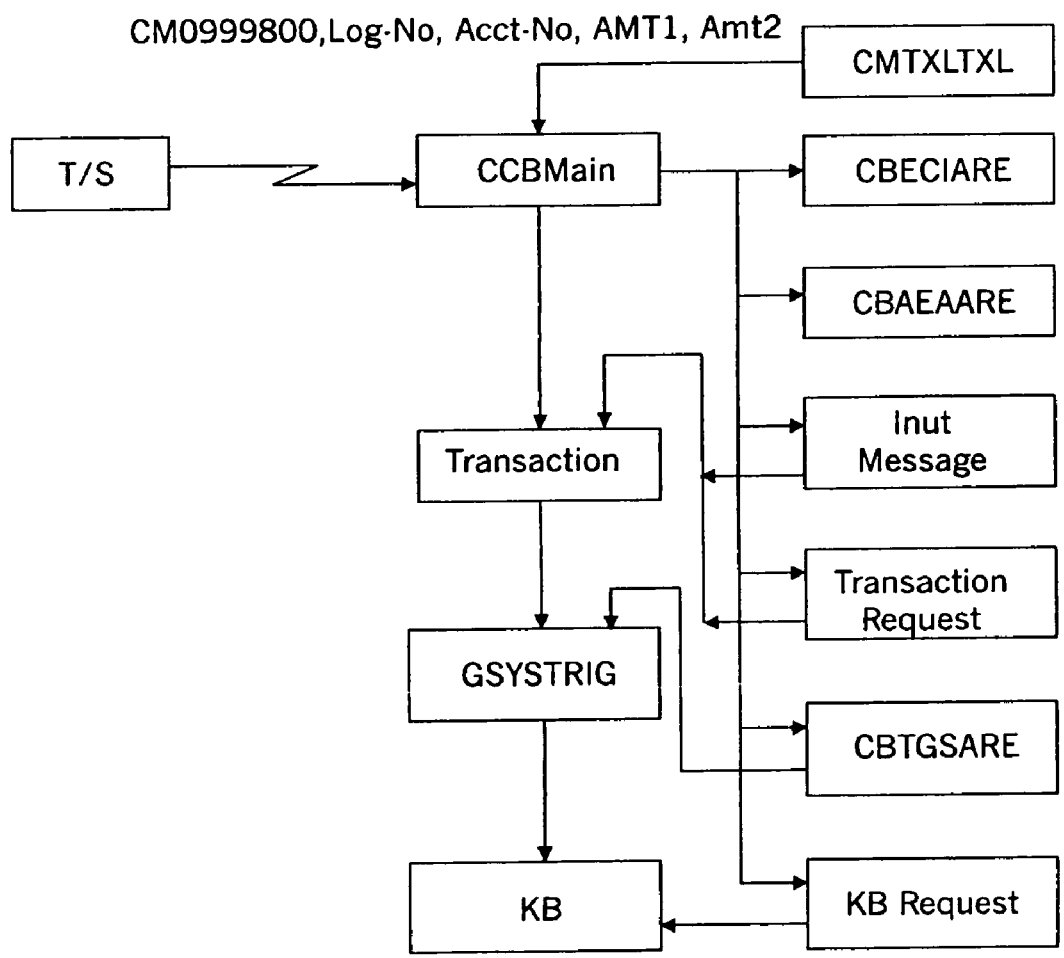
FIG. 18 is a diagram of the error correction process flow.

Referring to FIG. 18, the system working areas employed for error correction include error correction input information CBECIARE 112, which includes the authorizing director identification, account number, amounts for security verification, transaction log number, and the like. It also contains information from transaction log 108 for a normal transaction, for example, business date, system date and system time of the normal transaction. This area is prepared by CCBMain 36 for the follow-up error correction processing. A transaction request 114 is prepared by the application transaction program 26. Similar to KB 98 requests, transaction request 114 contains information from transaction program 26 to be written in the transaction log 108. The content of the transaction request 114 of the normal transaction is acquired through CCBMain 36 to recover the application databases.

In operation, a user sends a request for an error correction transaction to CCBMain 36. The request contains the transaction log 108 number of the normal transaction, an account number and one or two amounts. The account number and the two amounts are inputted by a teller. The amounts will be compared with corresponding fields in transaction log 108 recorded by the normal transaction to assure that the correct transaction will be error corrected. CCBMain 36 acquires the transaction log 108 of the normal transaction according to the transaction log 108 number. CCBMain 36 then fills in CBECIARE 112, and: recovers the input terminal 106 message, the CBAEAARE output area from server 100, the transaction request 114, a CBTGSARE area 116 and the KB 98 request areas of the normal transaction. CCBMain 36 also checks the account number and amounts as described above. CCBMain 36 next calls the transaction program 26 to conduct error correction processing. Transaction program 26 conducts error correction processing using the input data and transaction request 114 of the normal transaction. If required, KB 98 is called to error correct the effect of itself in the normal transaction.

When the transaction program 26 triggers KB 98 through a trigger GSYSTRIG 118, GSYSTRIG 118 acquires the KB request of KB 98 produced in the normal transaction according to the CBTGSARE area 116 of the normal transaction. After the error correction processing of transaction program 26 and KB 98, CCBMain 36 resumes control and reverses the update on the accounting databases of the normal transaction according to the CBAEAARE area of the normal transaction (from server 100). CCBMain 36 then sends the output message to terminal 106.

For the convenience of its customers, many banks must provide certain of its functions on a twenty-four hour basis, for example, automated teller machines (ATMs), point of sale terminals (POS), phone banking, enterprise banking, home banking and the like. This may be accomplished in the system of the present invention by "time slotting" or having similar batch processing executed in the same time period, which simplifies batch processing design and operation. In this manner, ATMs and other functions may still run while batch processing takes place. The following table illustrates an example of the operating sequence.

Time Slot

| Time Slot Start Time | | Time Slot Name/Processing |
|---|---|---|
| 6:30 pm | T1 | CenterCut Backup DB unload |
| 8:00 pm | T2 | End of current business day; transaction log unload; merge application data |
| 10:00 pm | Tn | Start of next business day; Backup 24 hour catch up |
| 12:00 pm | Tc | CenterCut Backup |
| 0:00 am– 6:30 pm | T0 | Start of online processing |

Figure 20:
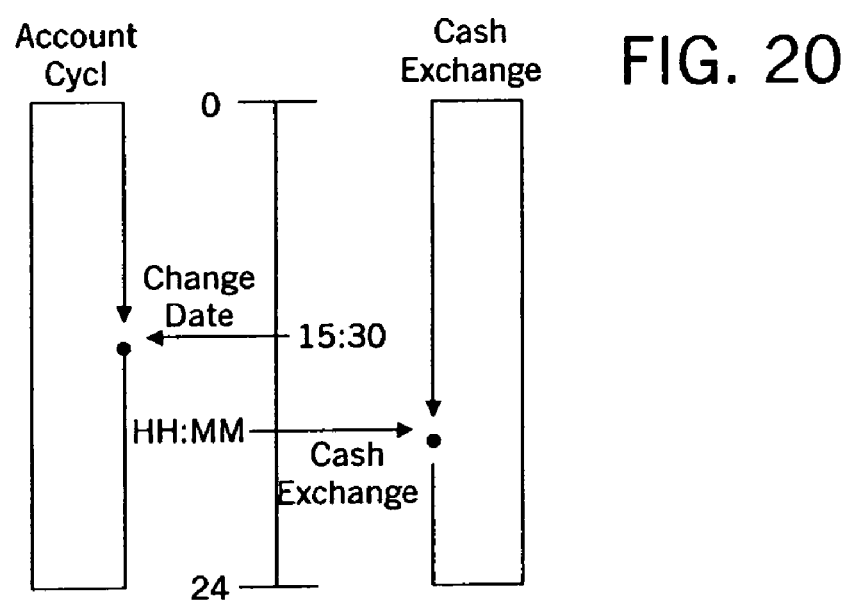
FIG. 20 is a diagram illustrating an ATM checking the accounts.
Figure 19:
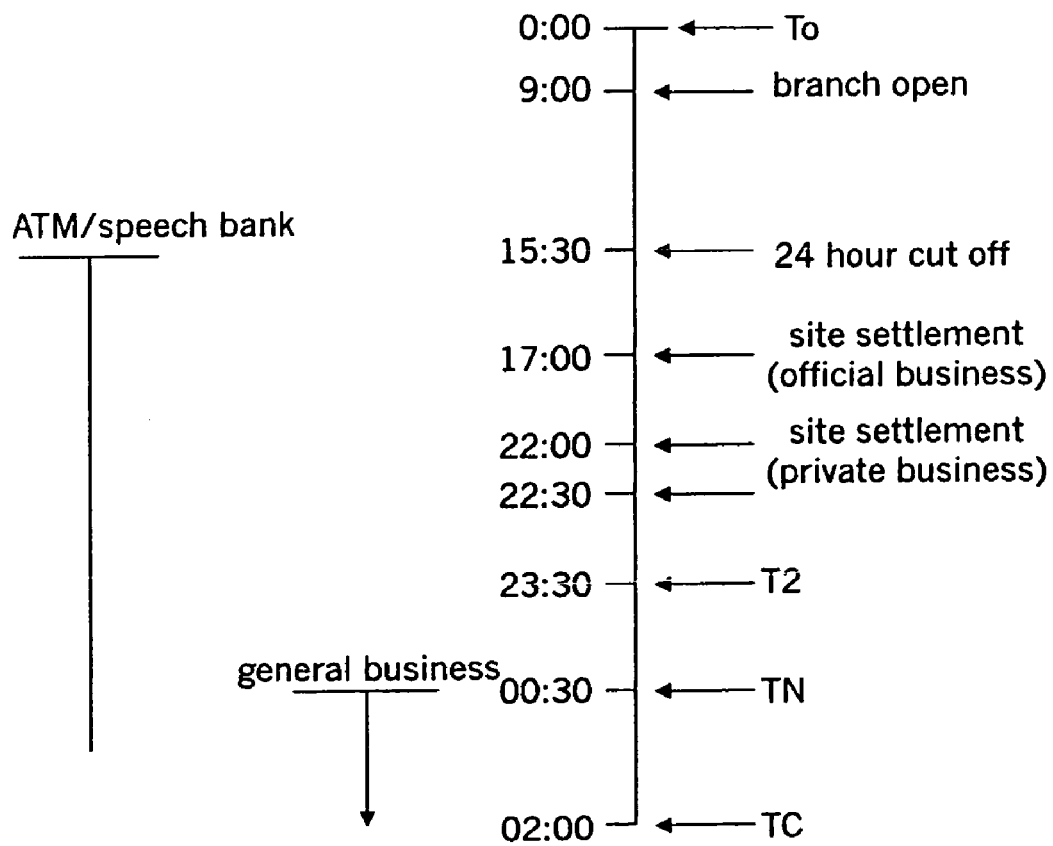
FIG. 19 is a diagram illustrating the business date cut off function.
Figure 21:
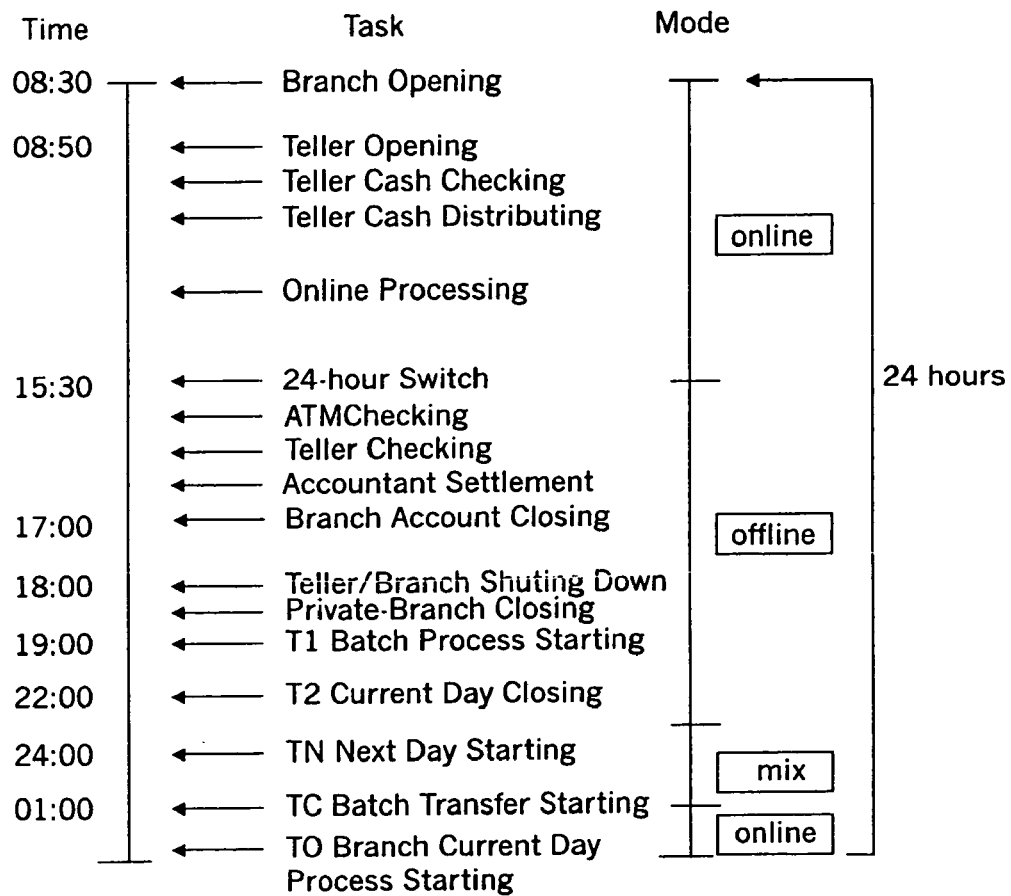
FIG. 21 is a diagram of the ATM processing mode and time slot.

Referring to FIG. 19, the business date cutoff for twenty-four hour transactions takes place before the first branch closing. A transaction occurring after the cutoff TN is treated as occurring on the next business day. A branch cannot close an account before the business date cutoff. Referring to FIGS. 20 and 21, there is shown the situation of an ATM checking the accounts, and the ATM job mode and time slot.

Figure 22:
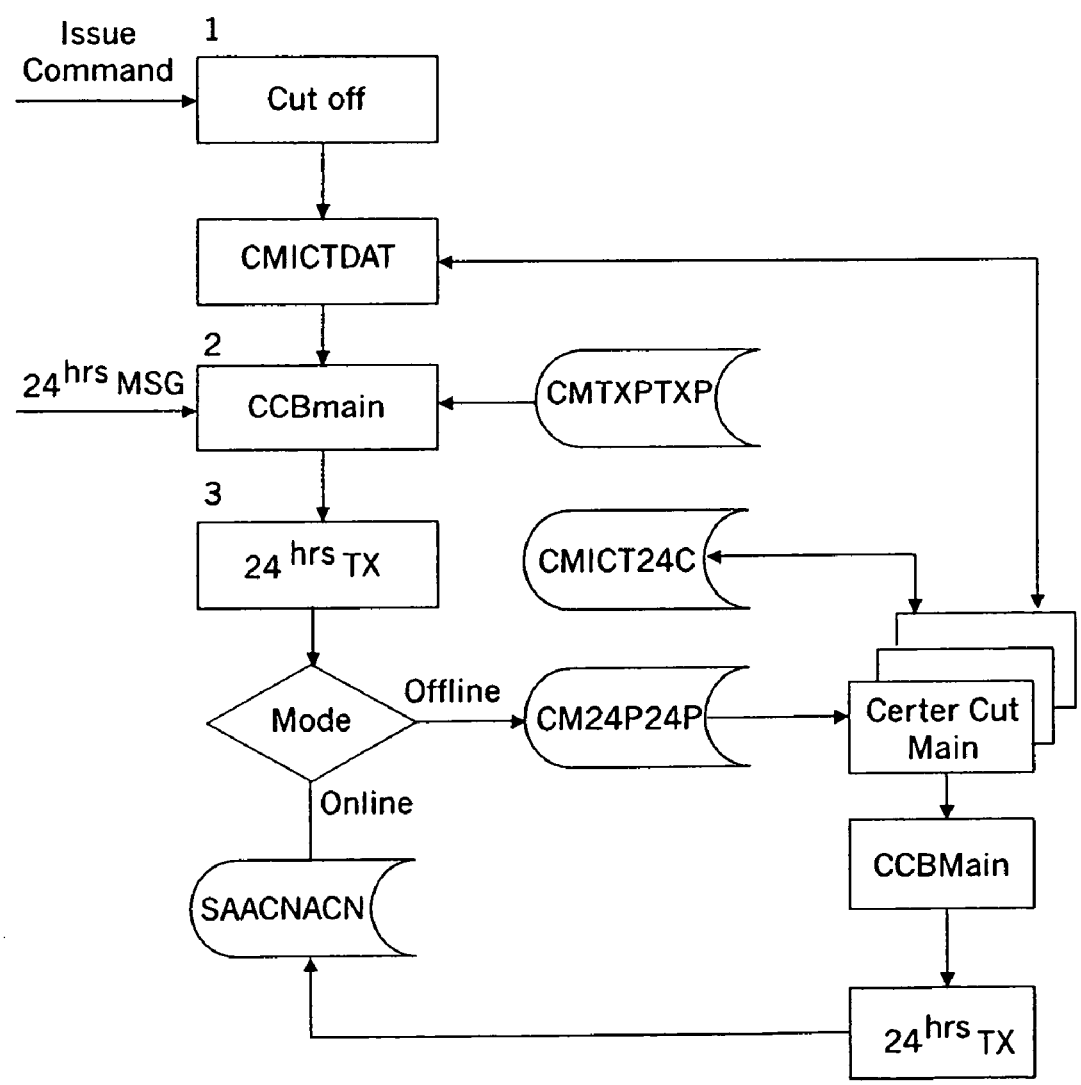
FIG. 22 is a diagram of a twenty four hour transaction process model.

FIG. 22 illustrates a twenty-four hour transaction processing model. A twenty-four hour cutoff 120 is performed by a data processing center every afternoon before the first branch closing time. When CCBMain 36 receives requests for twenty-four hour transactions ($24^{hrs}$ MSG), it invokes the transaction program 26 and invokes the twenty-four hour mode for the transaction. Transaction program 26 will determine whether it is in online or offline mode and then determines which databases to use, either the original application databases or temporary databases for the twenty-four hour mode. The updating for twenty-four hour transactions while in the offline mode is performed in the Tn time slot. The basic processing is to update the application and accounting databases according to the content of the twenty-four hour temporary database. Multiple CenterCut jobs can be launched to perform updates in order reduce the processing time.

Figure 23:
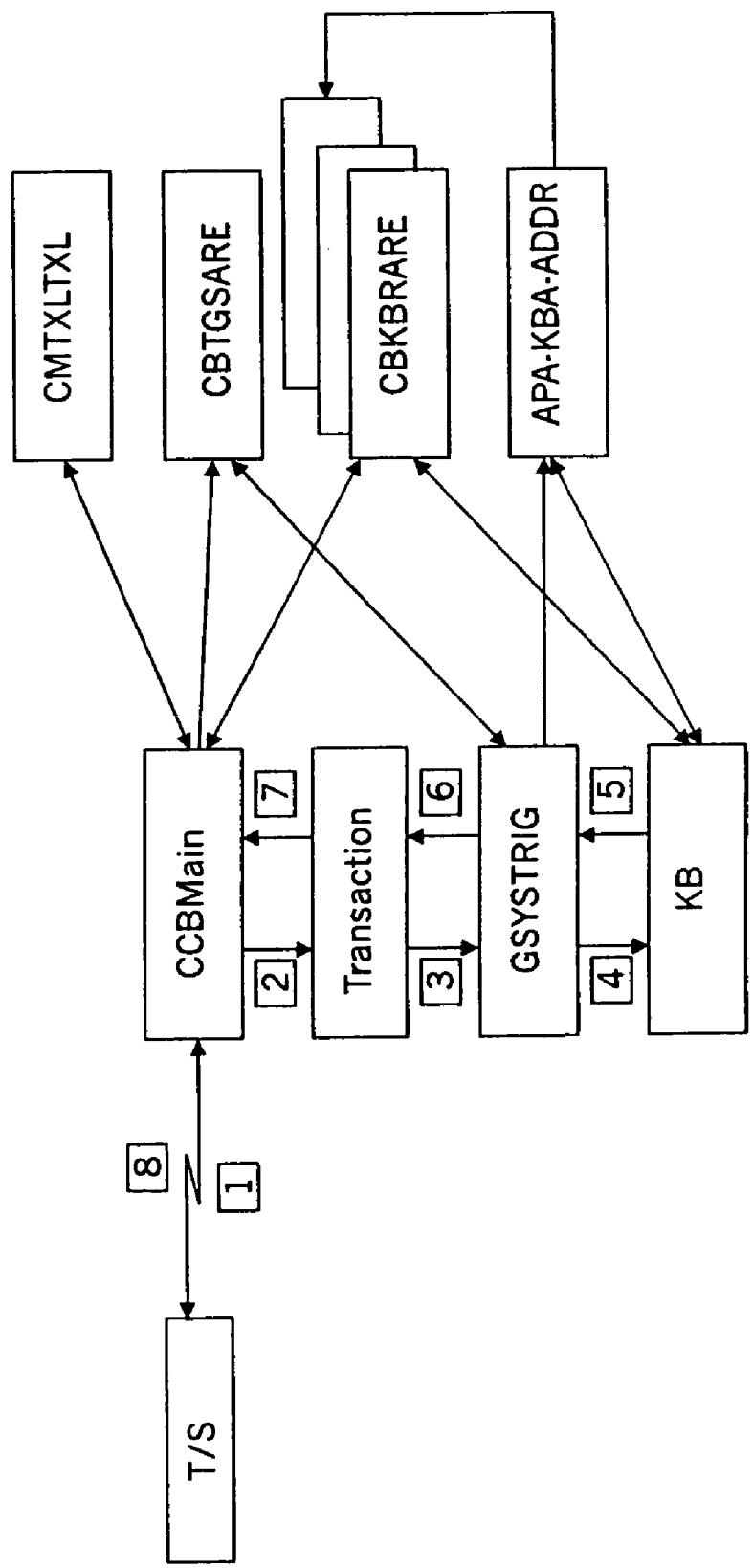
FIG. 23 is a diagram of the KB trigger process flow.

FIG. 23 illustrates KB 98 trigger process flow. The small numerals in FIG. 23 correspond to the following process steps:

1) In a normal transaction, terminal 106 sends a transaction request to CCBMain 36.
2) CCBMain 36 allocates space for CBKBRARE, CBTGSARE and other system work areas, and then calls the requested transaction program 26.
3) Transaction program 26 calls the GSYSTRIG 118 to trigger KB 98.

4) GSYSTRIG 118 checks whether the number of triggered KB 98 has reached 6. If so, the transaction fails and an error message is sent back to terminal 106. Otherwise, the next spare KB 98 request area in CBKBRARE is obtained, and APA-KBA-ADDR is set to the address of this KB 98 request. Next, the name of the triggered KB 98 and the triggering program are recorded in CBTGSARE, the number of triggered KB 98 is increased by 1 and KB 98 is called.
5) KB 98 obtains its KB request area via APA-KBA-ADDR and writes the necessary information into transaction log 108 for normal KB requests. When the processing is complete, KB 98 returns control to GSYSTRIG 118.
6) GSYSTRIG 118 returns control to transaction program 26.
7) After transaction processing is completed, transaction program 26 returns control back to CCBMain 36, which writes the normal KB 98 requests and the information in CBTGSARE into the transaction flow. When CCBMain 36 exits, CBKBRARE, CBTGSARE and other system work areas will be released.
8) CCBMain 36 sends the transaction output message to terminal 106.

In an error correction transaction:
1) Terminal 106 sends a transaction request to CCBMain 36.
2) CCBMain 36 allocates space for CBKBRARE, CBTGSARE and other system work areas, then retrieves the transaction log 108 of the normal transaction to be error corrected and restores CBKBRARE and CBTGSARE of the normal transaction according to the transaction log 108. CCBMain 36 then calls the transaction program 26.
3) Transaction program 26 executes its error correction logic then calls GSYSTRIG 118 to trigger KB 98.
4) GSYSTRIG 118 recovers the KB request that the current KB 98 generated during the normal transaction according to CBTGSARE and sets APA-KBA-ADDR to the address of this KB request.
5) KB 98 executes its error correction logic. The KB request produced during normal transaction is available via APA-KBA-ADDR. KB 98 can use data in the KB request to perform error correction. When the processing completes, KB 98 returns control to GSYSTRIG 118.
6) GSYSTRIG 118 returns control to transaction program 26.
7) After the transaction processing completes, transaction program 26 returns control to CCBMain 36, which writes error correction KB request areas and CBTGSARE into transaction log 108. When CCBMain 36 exits, CBKBRARE, CBTGSARE and other system work areas will be released.
8) CCBMain 36 sends the transaction output message to terminal 106

A knowledge block, for example KB 98, is the smallest unit that is able to perform a complete business operation. The knowledge block is the basic building block of an application subsystem. The features and functions of a knowledge block include completing a basic financial business function independently, updating application databases, error correction, writing to the transaction log 108, and generating output forms. Among these characteristics, the ability to independently complete a basic financial business function is the most important and basic one and differentiates a knowledge block from a common function.

In the system of the present invention, a knowledge block represents business rules of all the banking products and services that the system supports. Transaction program 26 is formed by assembling appropriate knowledge blocks. For example, a "transfer" transaction can be assembled by combining a "withdraw" knowledge block and a "deposit" knowledge block. The transaction program 26 can also be configured to override and customize functions provided by a knowledge block to meet special business requirements as necessary. Finally, knowledge blocks are only run or executed in an online mode.

By comparison, common functions are a set of programs that implement repeatedly used functions, for example, interest calculation, data inquiry and maintenance, data checking, and the like. Common functions can be designed to simplify application development and maintenance. Compared to knowledge blocks, common functions are not able to perform a complete business operation independently, are not financial and cannot write to transaction log 108. Further, common functions cannot be error corrected, they provide output only by means of output parameters and they cannot produce output forms. Common functions may, however, be used in batch environments that do not require database access and application errors in a common function do not cause a transaction failure. The program calling a common function provides error handling.

As described above, KB 98 must be triggered by a transaction program 26 or other KBs. Transaction program 26 or another KB triggers KB 98 by calling GSYSTRIG 118. The KB request areas are a set of system working areas in which KB 98 can save the information which will be written to transaction log 108. In a normal transaction, CCBMain 36 will store the content of the KB request areas into the transaction log 108 after the transaction successfully completes. In an error correction transaction, KB 98 can obtain the KB request it generated during the normal transaction via CCBMain 36 and use it to perform error correction processing. Major functions of the KB request include providing the information necessary for batch processing and storing the intermediate result during normal transaction for later error correction.

In one embodiment of the present invention, one transaction can trigger up to six knowledge blocks KB 98. Each KB request may be 256 Bytes in length. The KB request working area CBKBRARE contains all six normal KB requests, six reverse KB requests and a KB index. The KB index is the identification of the current KB request in CBKBRARE. In a normal transaction, the content of a normal KB request will be recorded into transaction log 108. In an error correction transaction, the normal KB request maintains the KB request generated during the normal transaction, and the content of the reverse KB request will be written into transaction log 108. In a normal transaction, trigger GSYSTRIG 118 records the name of each triggered KB 98, the name of the triggering program and the number of KBs triggered in CBTGSARE. After the transaction completes, CCBMain 36 writes it into the transaction log 108. In an error correction transaction, CBTGSARE returns the content of the same area of the normal transaction and GSYSTRIG 118 acquires the KB request area produced in the normal transaction for a KB request and stores the contents in CBTGSARE. The APA-KBA-ADDR is a field in CBAPALST which is used for accessing KB request areas.

Figure 12:
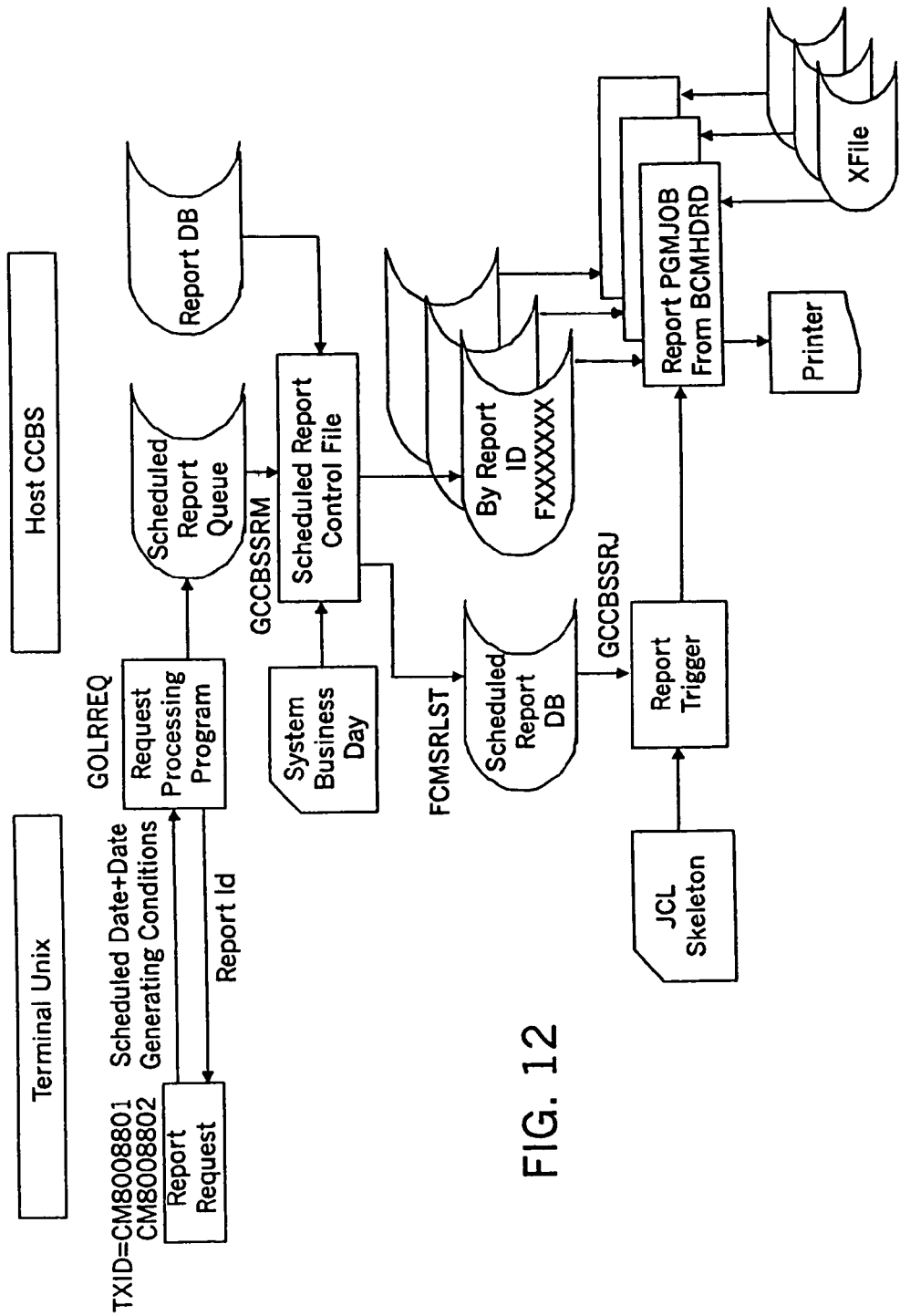
FIG. 12 is a diagram of a schedule report process flow.

Referring again to FIG. 1, generator 22 is a set of tool programs in the present core banking system 10 which generate selected source code, system tables, reports, and the like. Generator 22 is primarily used during development, maintenance and generation of batch reports to reduce application development and improve system performance. Most generators 22, including all data format generators and selected system table generators, use a data dictionary as input. In this manner, consistency between the generated results in different phases of system development is ensured. Accounting table generators use accounting table databases as input. For remote database management systems (RDBMS), all table copybooks, host structure copybooks and access engine programs are generated automatically. Typically, table copybooks and host structure copybooks are generated from the data dictionary to ensure design consistency. A file access engine generator provides a file access engine 60, as shown in FIG. 9, for each file according to its property definition file, which defines the file properties including file name, file type, allowed access method, minimum record length, maximum record length, fixed length or variable length, data format of numerical fields, and the like. A report generator, as shown in FIGS. 11 and 12, is a utility program used by a batch job to produce a report file from the job results. Various reporting functions are provided by means of customized parameters stored in the report generators.

The present core banking system 10 provides a program framework or skeleton 122, referring to FIG. 1, for all important types of application programs, such as KB, CF, batch programs, JCL programs using batch tools, CenterCut jobs, and the like. Skeleton 122 contains processing logic that is common for that kind of program and defines the program structure. During development of an application program, a developer only needs to fill in a template of the business processing logic particular to the program being developed. A skeletons 122 facilitates the development of standard programs, simplifying the development process and improving development efficiency and system quality. Skeleton 122 may conveniently include the program structure and common processing and common data definitions, for example, definitions of memory initialization and data definition of application interfaces. Error handling functions and frequently used sample code or subroutines may also be included.

Although the invention is described hereinabove with respect to preferred embodiments, it will be apparent to those skilled in the art that various modifications or alterations may be made which are intended to be included within the scope of the invention as set forth in the appended claims.

What is claimed is:

1. A system for developing a banking transaction processing system that processes banking transactions for accounts, wherein terminals request banking transactions by sending messages to the banking: transaction processing system, comprising:
   at least one processor; and
   at least one memory accessible by the processor, wherein the at least one memory includes:
   a business platform; that comprises platform independent program code for receiving messages and processing the banking transactions, the business platform including:
      a set of application transactions, wherein each application transaction processes a unique banking transaction and undoes the unique banking transaction after the unique banking transaction bas been mistakenly processed;
      a main module for processing a banking transaction and an undo request for a previously processed banking transaction, wherein the main module initiates at least one of the set of application transactions based on a message received from a terminal and comprising one of the banking transaction and the undo request; and
      a message formatter module for providing data on banking transactions based on the messages requesting the banking transactions;
      a set of knowledge blocks, wherein each knowledge block implements a unique banking operation and undoes the unique banking operation after the unique banking operation has been mistakenly processed, wherein at least one application transaction triggers at lest one knowledge block to process the unique banking transaction;
      a set of system processing functions for providing a platform independent interface between the business platform and a sewer; and
      an interface allowing a user to add each of a new application transaction and a new knowledge block.

2. The system of claim 1, further comprising a set of common functions, wherein each common function performs a unique business function, and wherein at least one knowledge block uses at least one common function to implement the unique banking operation.

3. The system of claim 1 further comprising:
   a data dictionary that defines data requirements; and
   a generator that automatically generates a data layout based on the data dictionary, wherein the data layout is used by the business platform.

4. The system of claim 1, further comprising a set of accounting application servers, wherein each accounting application server processes an accounting entry, and wherein at least one application transaction generates at least one accounting entry.

5. The system of claim 1, wherein at least one of a group consisting of the business platform, the set of knowledge blocks, and the set of system processing functions comprises a set of skeletons, wherein each skeleton includes common processing logic for implementing a desired function, and wherein the interface allows a user to modify each skeleton.

6. The system of claim 1, wherein the business platform further includes a database interface module for providing a platform independent interface between the main module and at least one database.

7. The system of claim 1, wherein the business platform further includes a file interface module for providing a platform independent interface between the main module and a file system of a computer.

8. The system of claim 1, wherein the business platform further includes a centercut control module for processing a batch job having banking transactions, wherein each banking transaction is implemented by the main module.

9. The system of claim 1, wherein the business platform further includes an online report module for providing an interface between the terminals and a report generator.

10. The system of claim 1, wherein the business platform further includes an external interface module for providing a platform independent interface between the main module and the terminals.

11. The system of claim 10, wherein each terminal is selected from a group consisting of: an automatic telling machine, a teller terminal, a point-of-sale terminal, a credit card machine, and a personal computer.

12. The system of claim 1, wherein the business platform further includes a testing driver for simulating a terminal.

13. The system of claim 1, wherein each business transaction is selected from a group consisting of: a current deposit, a fixed deposit, a withdrawal, a loan, a settlement, a credit card transaction, a debit card transaction, an accounting, an electronic remittance, an inquiry, and a clearance.

14. A system for processing banking transactions, comprising:
- a plurality of terminals for generating messages, wherein each message requests a banking transaction; and
- at least one computer, wherein the at least one computer includes:
- a business platform, including;
  - a set of application transactions, wherein each application transaction processes a unique banking transaction and undoes the unique banking transaction after the unique banking transaction has been mistakenly processed;
  - a main module for processing a banking transaction and an undo request for a previously processed banking transaction, wherein the main module initiates at least one of the set of application transactions based on a message received from a terminal and comprising one of the banking transaction and the undo request;
  - a message formatter module for providing data on a banking transaction based on a message requesting the banking transaction;
  - a database interface module for providing a platform independent interface between the main module and at least one database;
  - an external interface module for providing a platform independent interface between the main module and the terminals; and
  - a file interface module for providing a platform independent interface between the main module and a file system of the at least one computer;
  - a set of knowledge blocks, wherein each knowledge block performs a unique banking operation and undoes the unique banking operation after the unique banking operation has been mistakenly processed, and wherein at least one banking transaction is processed using at least one banking operation; and
  - a set of system processing functions for providing a platform independent interface between the business platform and each of the at least one computer.

15. The system of claim 14, wherein the business platform further includes a centercut control module for processing a batch job having a plurality of banking transactions, wherein each banking transaction is processed using the main module.

16. The system of claim 14, wherein the business platform further includes an online report module for providing an interface between the terminals and a report generator.

17. The system of claim 14, further comprising a set of common functions, wherein each common function performs a unique business function, and wherein at least one banking operation includes at least one business function.

18. The system of claim 14, wherein each terminal is selected from a group consisting of: an automatic telling machine, a teller terminal, a point-of-sale terminal, a credit card machine, and a personal computer.

19. The system of claim 14, wherein each business transaction is selected from a group consisting of: a current deposit, a fixed deposit, a withdrawal, a loan, a settlement, a credit card transaction, a debit card transaction, an accounting, an electronic remittance, an inquiry, and a clearance.

20. A method of developing a banking transaction processing system that includes a business platform for processing banking transactions, comprising:
- providing a data dictionary that defines a set of data requirements;
- providing a set of skeletons that define the business platform, wherein each skeleton comprises platform independent program code that includes common processing logic for a desired function of the skeleton;
- providing a set of file definition files, wherein each file definition file defines a set of properties for file;
- automatically generating a data layout based on the data dictionary, wherein the business platform uses the data layout;
- automatically generating a database interface module based on the data layout, wherein the database interface module provides a platform independent interface between the business platform and at least one database;
- automatically generating a file interface module based on the set of file definition files, wherein the file interface module provides a platform independent interface between the business platform and a file system of a computer; and
- allowing a user to modify the set of skeletons;
- wherein the business platform includes:
  - a set of application transactions, wherein each application transaction processes a unique banking transaction and undoes the unique banking transaction after the unique banking transaction has been mistakenly processed; and
  - a main module for processing a banking transaction and an undo request for a previously processed banking transaction, wherein the main module initiates at least one of the set of application transactions based on a message received from a terminal and comprising one of the banking transaction and the undo request.

* * * * *